United States Patent
Ragucci et al.

(10) Patent No.: US 7,859,653 B2
(45) Date of Patent: Dec. 28, 2010

(54) DETECTING STRAIN IN BIREFRINGENT MATERIALS USING SPECTRAL POLARIMETRY

(75) Inventors: Anthony J. Ragucci, Bryan, TX (US); Alan J. Cisar, Cypress, TX (US); Michael L. Huebschman, Frisco, TX (US); Harold R. Garner, Flower Mound, TX (US)

(73) Assignee: Lynntech, Inc., College Station, TX (US)

( * ) Notice: Subject to any disclaimer, the term of this patent is extended or adjusted under 35 U.S.C. 154(b) by 574 days.

(21) Appl. No.: 11/848,284

(22) Filed: Aug. 31, 2007

(65) Prior Publication Data

US 2008/0094609 A1    Apr. 24, 2008

Related U.S. Application Data

(60) Provisional application No. 60/824,281, filed on Aug. 31, 2006.

(51) Int. Cl.
  *G01B 11/16*    (2006.01)
(52) U.S. Cl. ....................................... 356/33
(58) Field of Classification Search ........................ None
  See application file for complete search history.

(56) References Cited

U.S. PATENT DOCUMENTS

| | | |
|---|---|---|
| 4,425,808 A | 1/1984 | Rand |
| 4,498,231 A | 2/1985 | Rand |
| 4,668,086 A * | 5/1987 | Redner .................. 356/33 |
| 4,877,205 A | 10/1989 | Rand |
| 5,104,059 A | 4/1992 | Rand et al. |
| 6,160,618 A | 12/2000 | Garner |
| 6,490,043 B1 | 12/2002 | Kebabian |
| 6,657,758 B1 | 12/2003 | Garner |
| 6,762,713 B1 | 7/2004 | McMillan et al. |
| 6,813,018 B2 | 11/2004 | Richman |
| 6,867,863 B1 * | 3/2005 | Kadlec .................. 356/364 |
| 6,906,800 B2 | 6/2005 | Serna, Jr. |
| 6,943,869 B2 * | 9/2005 | Hubner et al. ............ 356/34 |
| 7,310,145 B2 * | 12/2007 | Abuzaina et al. ......... 356/365 |
| 2003/0020911 A1 * | 1/2003 | Wang et al. ............ 356/364 |
| 2006/0007424 A1 * | 1/2006 | Hubner et al. ............ 356/34 |

* cited by examiner

*Primary Examiner*—Gregory J Toatley
*Assistant Examiner*—Juan D Valentin
(74) *Attorney, Agent, or Firm*—Jeffrey L. Streets; Streets & Steele

(57) ABSTRACT

A method, computer program product and system for analyzing multispectral images from a plurality of regions of birefringent material, such as a polymer film, using polarized light and a corresponding polar analyzer to identify differential strain in the birefringent material. For example, the birefringement material may be low-density polyethylene (LDPE), high-density polyethylene (HDPE), polypropylene, polyethylene terephthalate (PET), polyvinyl chloride (PVC), polyvinylidene chloride, polyester, nylon, or cellophane film. Optionally, the method includes generating a real-time quantitative strain map.

36 Claims, 25 Drawing Sheets

DETECTING STRAIN IN BIREFRINGENT MATERIALS USING SPECTRAL POLARIMETRY

This application claims priority from U.S. provisional patent application Ser. No. 60/824,281 filed on Aug. 31, 2006.

This invention was made with government support under contract number NNG06LA05C awarded by the National Aeronautics and Space Administration (NASA). The government has certain rights in this invention.

BACKGROUND OF THE INVENTION

1. Field of the Invention

The present invention relates to methods of detecting strain in birefringent materials.

2. Background of the Related Art

Strain is a geometrical expression of deformation caused by the action of stress on a physical body. Strain therefore expresses itself as a change in size and/or shape, and is typically measured as a percentage elongation.

When transparent, isotropic materials are squeezed, bent or stretched to become anisotropic, birefringence can result. Birefringence, or double refraction, is the decomposition of a ray of light into two rays when it passes through certain types of material, such as calcite crystals, depending on the polarization of the light. This effect can occur only if the structure of the material is anisotropic. Many plastics are birefringent, because their molecules are 'frozen' in a stretched conformation when the plastic is molded or extruded. Alternatively, many plastics such as cellophane exhibit birefringence when strained.

A pressurized balloon formed of polyethylene film is a good example of a birefringent material that may become strained. One existing method for monitoring balloon strain in flight uses permanent marks on the balloon with a known distance between them at zero strain to determine stretch via a video inspection feed. Another method uses distributed piezoelectric strain gauges on the surface of the balloon and relies on the electrical signal produced in the gauges as the film stretches. A third approach involves the monitoring of differential Global Positioning System (GPS) receivers arrayed around the balloon surface to determine stretch in the film. However, each of these approaches has shortcomings which limit its functionality and practicality for this application.

The use of photogrammetry is currently the most viable method of measuring strain in balloons. As the balloon expands, the distance between marks on the balloon increases and the length increase can be measured directly. However, the requirement that multiple cameras be used for triangulation of point positions complicates this measurement approach significantly. Additionally, measurements can only be taken from discrete points on the balloon where marks had been made. Even when the film could be directly measured, this measurement method is limited to an accuracy of approximately 0.5%, with the values obtained representing an average over the entire range. This resolution limit can lead to small defects being missed.

Distributed strain gauges are inherently noisy and do not provide data from much of the balloon's surface. High noise levels in the signals make it difficult to detect the small changes that can be precursors of a larger failure. Averaging the data over time can improve sensitivity but it can delay detection of an impending failure. In addition, because strain gauges can only report changes in the local area around the strain gauge, localized failures between strain gauges can go undetected. Increasing the density of the strain gauges can improve the coverage, but more gauges and their connections also increase the weight of the system. This increase reduces the load capacity of the balloon, which means less instrumentation can be carried.

Using differential GPS (DGPS) is logistically complex and requires careful mounting of GPS receivers over the entire surface of the balloon. This type of system is less sensitive, and cannot detect point failures until they are large enough to deform the entire balloon shell. Current, state-of-the-art DGPS receivers have a relative accuracy measured in centimeters. Therefore, this approach would only be practical for monitoring large-scale balloon deflections. Like strain gauges, increasing receiver density can improve the coverage. However, such an increase in receiver number would increase the weight of the system and reduce the load capacity of the balloon. An effective system for measuring the strain on the balloon would preferably monitor the entire surface of the balloon with no need for an extensive network covering the surface of the balloon. Ideally, such a system would be able to detect impending failure of all sizes and from a variety of causes while adding a minimum of weight.

All the methods described above have fundamental limitations that severely limit the precision and accuracy capabilities of a balloon strain monitor. Therefore, there is a need for an improved method and system for measuring strain in birefringent materials, such as a plastic film forming a balloon. It would be desirable if the method and system were adaptable to measuring strain in birefringent materials in a variety of applications, including plastic film production processes and quality control. Ideally, such a method and system would provide spatially continuous monitoring of the birefringent material. Furthermore, it would be desirable if the method and system provided greater accuracy than any of the other existing technologies described above.

SUMMARY OF THE INVENTION

One embodiment of the present invention provides a method comprising analyzing multispectral images from a plurality of regions of birefringent material, such as a polymer film, using polarized light and a corresponding polar analyzer to identify differential strain in the birefringent material. For example, the birefringent material may be low-density polyethylene (LDPE), high-density polyethylene (HDPE), polypropylene, polyethylene terephthalate (PET), polyvinyl chloride (PVC), polyvinylidene chloride, polyester, nylon, or cellophane film or fiber. Optionally, the method includes generating a real-time quantitative strain map.

Another embodiment of the present invention provides a method of identifying strain in a birefringent material, comprising measuring light intensity (I) as a function of wavelength ($\lambda$) from a polarized light source through the surface area of the birefringent material and another polarizer, identifying the location of light intensity measurements that indicate the presence of optical retardation beyond a setpoint, and calculating a value representative of the extent of the optical retardation, such as a differential strain value. Alternatively, if the step of measuring is performed in the absence of any strain fluctuations, then the optical retardation may be attributed to deviations in thickness.

Yet another embodiment of the present invention provides a method of identifying strain, comprising detecting light intensity (I) as a function of wavelength ($\lambda$) from polarized light transmitted through birefringent material and another polarizer for each of a plurality of regions over a surface of birefringent material under differential strain ($\Delta\sigma$), calculating an optical retardation ($\delta$) value for each of the plurality of regions as the best fit of the light intensity (I) as a function of wavelength ($\lambda$) data for that region using the transmittance relation $T \propto \sin^2[\pi(\delta/\lambda)]$, wherein the transmittance (T) is a ratio of the light intensity detected under differential strain ($I_{strain}$) to light intensity through the birefringent material without strain ($I_{relaxed}$) or with unpolarized light or with linearly polarized light in which the polarization axis is aligned with the primary strain direction, as a function of wavelength ($\lambda$), and calculating a differential strain ($\Delta\sigma$) value for each of the plurality of regions by applying a correlation between optical retardation ($\delta$) and differential strain ($\Delta\sigma$) to the optical retardation ($\delta$) value calculated for that region. Optionally, the method may include identifying each of the plurality of regions by coordinates, and producing a map of the differential strain values arranged by the coordinates of the plurality of regions.

Preferably, the step of detecting light intensity (I) as a function of wavelength ($\lambda$) for each of a plurality of regions includes the steps of: (a) detecting light intensity (I) as a function of wavelength ($\lambda$) for each of a plurality of regions positioned along a first coordinate axis, and then (b) repeating step (a) for each of plurality of positions along a second coordinate axis. Optional further embodiments may include determining the polarization fraction of incoming light, using the polarization fraction to distinguish intensity variations resulting from changes in polarization fraction from intensity variations resulting from film strain, and factoring out intensity variations resulting from changes in polarization fraction. Still further, the method may include using a lens to control the size of each of the regions.

A further embodiment of the present invention provides a computer program product comprising a computer useable medium including a computer readable program, wherein the computer readable program when executed on a computer causes the computer to perform a method of the present invention.

A still further embodiment of the present invention provides a system for identifying strain in a birefringent material using a light source having an unknown polarization fraction, a variable polarization fraction or non-uniform distribution of polarization fraction. The system may comprise a hyperspectral polarimeter including a CCD camera, spectrograph, lens, and rotating polarizer for measuring light intensity as a function of wavelength, wherein the lens is disposed to focus light into the spectrograph, and wherein the rotatable polarizer is disposed in front of the lens or between the lens and the hyperspectral polarimeter, a computer processor in communication with the CCD camera for receiving the light intensity measurements; and a computer readable medium in communication with the processor and containing instructions, which when executed by the processor, cause the processor to determine an optical retardation value from the recorded intensity measurements, map this to a differential strain value, and create a map of strain in the birefringent material under analysis. In specific implementations, the system may optionally further include a solar tracking device, and a rotatable base for controllably rotating the hyperspectral polarimeter at approximately right angles to the sun.

DETAILED DESCRIPTION OF THE INVENTION

Figure 1:
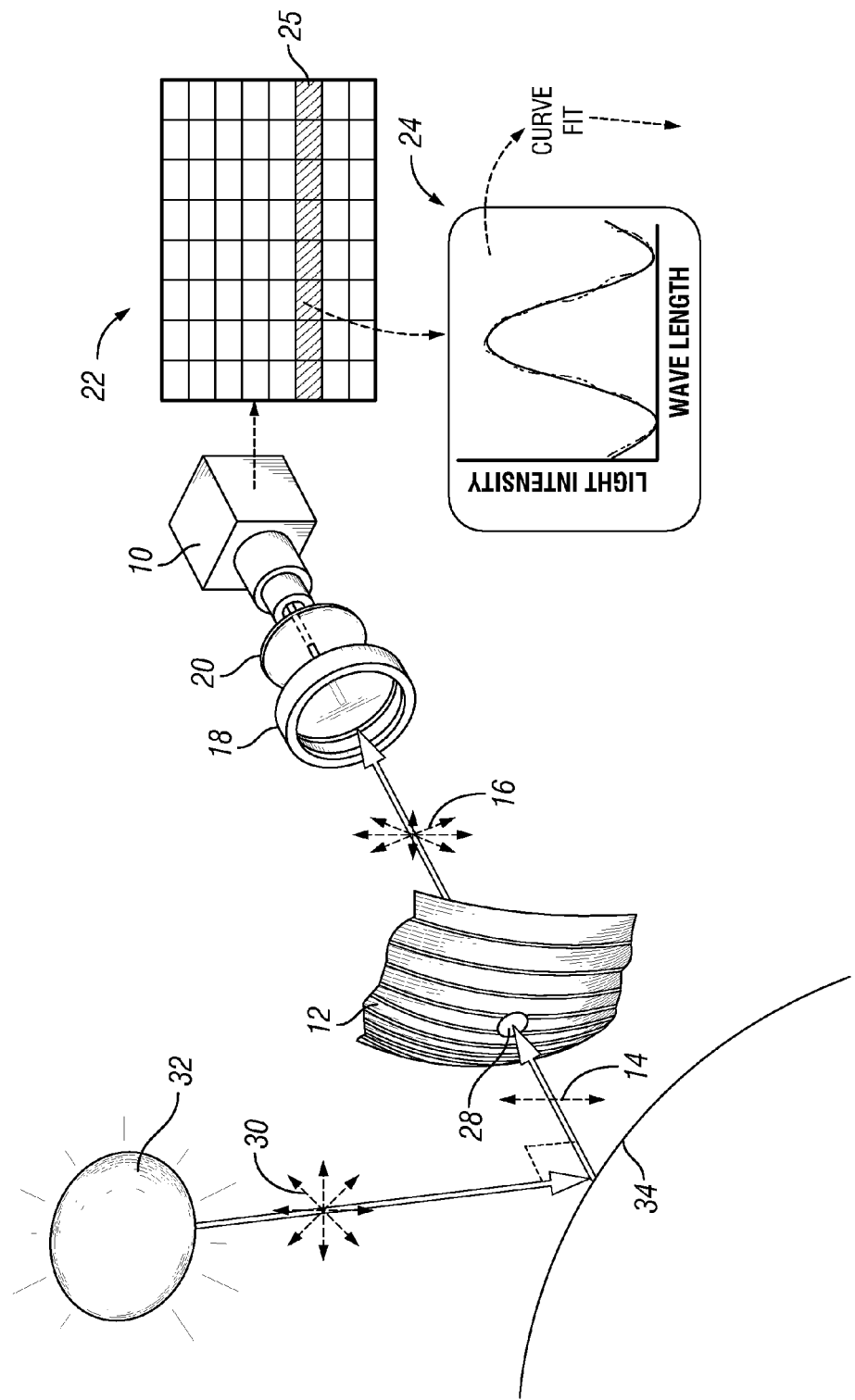
FIG. 1 is a schematic diagram of hyperspectral polarimeter (HP) being used to measure strain of birefringent film with a source of polarized light in accordance with the present invention.

FIG. 1 is a schematic diagram of hyperspectral polarimeter (HP) 10 being used to measure strain of birefringent film 12 with a source of polarized light 14 in accordance with the present invention. Unpolarized light 30 from the sun 32 is scattered from the atmosphere 34 and becomes linearly polarized when viewed from a 90° scattering angle. This polarization can also be used to analyze the strain in balloon films. The polarized light is optically retarded as it passes through the birefringent film. The optically retarded light 16 contains the strain information needed for analysis. After passing through a lens assembly 18, the light traverses an analyzing polarizer 20 and is detected on a CCD imaging array 22 of the HP 10. A spectrum 24 of light intensity as a function of wavelength is recorded for each pixel row 26 of the CCD array 22. A curve-fit is automatically performed on the spectrum obtained from each pixel row to determine the magnitude of optical retardation, which is proportional to strain. Other rows of the CCD array 22 image other points along a vertical line on the balloon film 12. Balloon rotation, for example, provides the scanning motion to image the entire balloon film. A complete strain map of the film is then produced by plotting the differential strain values determined for each point (such as point 28) on the film where the light came through.

Birefringent materials have two indices of refraction, a fast axis and a slow axis, which separate incident polarized light into two wavefronts traveling at two different velocities. Most polymer films become birefringent when they are stretched, such as low linear density polyethylene (LLDPE). The molecular orientations of the polymer chains are re-arranged as the polymer is pulled, producing an anisotropy in the film. This effect, known as stress birefringence or photoelasticity, allows a high degree of correlation between the strain in the polymer film and the alteration of the light polarization.

The Stress-Optic Law, or Brewster's Law, states that the relative change in the index of refraction is proportional to the difference in principal stresses applied to the material, $$(n_1 - n_2) = C_B(\sigma_1 - \sigma_2)$$

where $n_1$ and $n_2$ are the indices of refraction, $\sigma_1$ and $\sigma_2$ are the principle stresses, and $C_B$ is the stress-optical constant. Therefore, the difference in principal stresses is directly proportional to the birefringence, $n_1 - n_2 = \Delta n$. This birefringence causes a phase lag between the fast and slow light wavefronts in the material known as retardation, $\delta$. This retardation can be directly determined from the birefringence of a material and its thickness, t, as $\delta = \Delta n \cdot t$. Combining these equations, the differential stress in the material can be determined;

$$\sigma = (\sigma_1 - \sigma_2) = \delta/(tC_B).$$

An identical relationship exists with strain for relevant materials within a range of deformation, albeit with a different constant of proportionality than $C_B$. This strain relationship is used for the present invention.

To measure the retardation of the light, an analyzing polarizer is used to cause the intensity of transmitted light to vary with wavelength, producing an interference spectrum. The fractional transmittance of light as a function of wavelength can be described as $$T(\lambda) \propto \sin^2[\pi(\delta/\lambda)].$$

Using this relation, the retardation in the birefringent material and, thus, the strain can be directly determined by curve-fitting the spectrum of light passing through the analyzing polarizer.

In polyethylene film, birefringence is directly proportional to strain and a similar relation to the stress-optic law applies. Although stress is proportional to strain for small deformations, hysteresis effects become apparent when the film is deformed beyond a point. However, the linear relationship between strain and birefringence remains constant for all deformations. Other polymer films such as polyester and nylon are photoelastic as well, although polyethylene is predominantly discussed here, since it is a common polymer film used in many applications, such as the shell construction of an Ultra Long Duration Balloon (UDLB).

Figure 2:
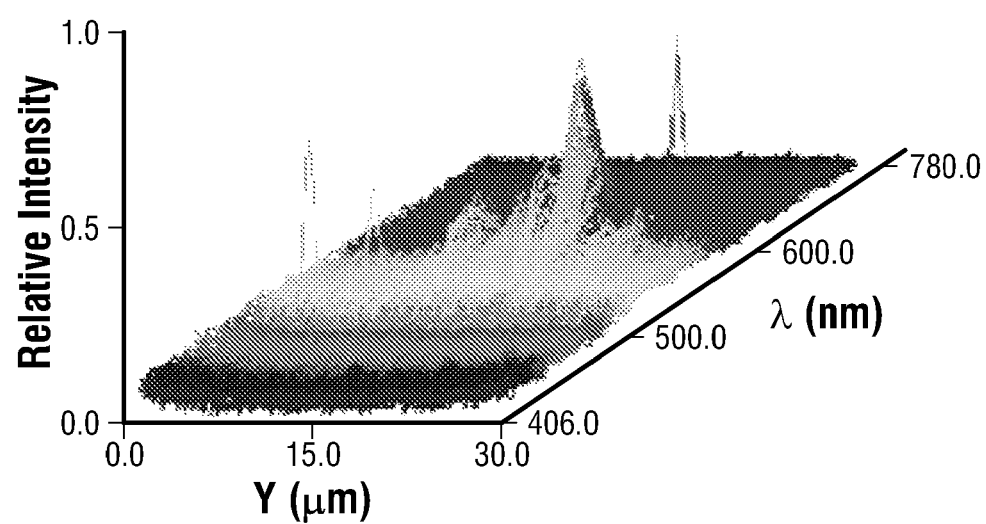
FIG. 2 is a graph of relative intensity as a function of distance in the Y direction for the wavelengths between about 406 nm and 780 nm.

Hyperspectral imaging itself is well-established and has been used for years in the field of astronomy. Hyperspectral imaging collects a continuous emission spectrum by dispersing the wavelength of light using gratings and measuring the wavelength intensities. A hyperspectral image is fully three dimensional. Every XY spatial pixel of the image has an arbitrarily large number of wavelengths allied with it. Ultimately, an intensity cube of data is collected for which two of the axis of the cube are spatial and one axis is wavelength. At each of the points in the 3D cube, there is an associated intensity value. Therefore, a plurality of the hyperspectral images provide four-dimensional information space. FIG. 2 illustrates a hyperspectral image for a single line scan in the Y direction. Specifically, FIG. 2 is a graph of relative intensity as a function of distance in the Y direction for the wavelengths between about 406 nm and 780 nm.

When the light source is not 100% polarized, such as would be the case on an actual ULDB flight, then the HP must be able to distinguish intensity variations due to changes in polarization fraction from intensity changes due to film strain. In order to achieve this, a technique has been devised which permits the determination of both polarization fraction and optical retardation from incoming light by rotating the polarizer in front of the HP. In 100% polarized light, the transmission coefficient through film with $\sigma$ at 45° to the axes of the crossed polarizers it is located between is $\sin^2(\pi\delta/\lambda) = A$. Therefore, the measured light intensity through this arrangement would be $T_+ = BA$, where B is the background intensity through unstrained film between parallel polarizers. If the light is only fractionally polarized, as represented by the factor P, then the transmitted light intensity through strained film between crossed polarizers becomes $T_+ = B(1-P) + BPA$, Likewise, for 100% polarized light, the transmission coefficient for strained film through parallel polarizers is $T_= = B - BA$. However, in fractionally polarized light, the transmission becomes $T_= = B - BPA$. By linearly combining the two equations for transmission of fractionally polarized light, either the polarization fraction or the optical birefringence can be determined independently, as indicated below.

$$P = (2B - T_+ - T_=)/B \quad A = \sin^2(\pi\delta/\lambda) = (B - T_=)/(2B - T_+ - T_=)$$

Therefore, by rotating the polarizer on the HP, the film strain can be determined even if the polarization fraction is unknown.

However, if you assume the light source is 100% polarized, then the simpler relationship for the transmission coefficient may be used. For the special case of 100% polarization, a background spectrum is obtained by imaging unstrained film between parallel polarizers. The data set for strained film between two crossed polarizers is read in next. In order to avoid an artificial offset in measured intensity, the "dark count" intensity measured with the HP shutter closed is subtracted from each spectrum and the background spectrum. This value is usually small in relation to the measured intensity (e.g. 70 counts out of a maximum of 4,096). The spectrum collected for each pixel is then divided by the background spectrum to produce the interference spectrum from which the optical retardation value is determined. (See graphs in FIGS. 3A through 3P).

Once the interference plots for each pixel of an analysis map are obtained, they were fit to determine the value for optical retardation. Two approaches were explored for simple film strain at 45° to the axes of two crossed polarizers. The first used a one-parameter fit to $\delta$ in the function $T = \sin^2(\pi\delta/\lambda)$, where T is the fractional intensity transmitted, $\delta$ is the optical retardation, and $\lambda$ is the light wavelength.

To automatically generate a birefringence map from recorded data, an initial guess for the $\delta$ fitting parameter must be determined. Although "goodness of fit" may be visually apparent to a human user, the development of a separate optimization process to determine an appropriate starting parameter was necessary for automatic map generation. To determine this initial guess, five distributed points on the map were chosen as representative pixels. Fits were then performed on those points for a wide range of initial guesses for $\delta$ and the residuals of these fits were plotted as a function of $\delta$.

The δ value which produced a global minimum was then used as the initial guess parameter for all other pixels to produce a strain map. This technique produced accurate fits over a wide range of mapping conditions in slightly more than one minute. It may also be possible to obtain the strain information simply through polarizer rotation, without taking an initial background measurement.

A prototype hyperspectral imaging device was adapted for collecting the complete visible emission spectrum. The system was built around a standard Olympus IX70 epifluorescence microscope. For polarimetry measurements, a brightfield tungsten source was used to produce a broad, blackbody irradiance similar to solar light in the visual range. The side port of the microscope was optically coupled to a SpectraPro 556i spectrograph (Acton Research Corp., Acton, Mass.). A narrow entrance slit into the spectrograph allowed for only one line (~0.1 μm using a 100× objective) of the image to be photographed.

The calculations described above for 100% polarized light were programmed using the MATLAB® platform by MathWorks. This software was then used to analyze the data sets produced from the hyperspectral imager. The software operated by first collecting a background image, consisting of unstrained film between two parallel polarizers, to generate an average reference spectrum. This reference was used to normalize the source intensity, absorption from the film and polarizer, detector efficiency profile, and other system components which may attenuate the signal non-uniformly as a function of wavelength.

EXAMPLE 1

Optical Retardation Maps

A series of tests were performed in which a polyethylene film sheet for a ULDB was uniaxially and incrementally strained a known and uniform amount using a film tensioning jig and the birefringence of the film was measured using the software methodology described above. The data from these tests is shown in FIGS. 3A-3P and FIGS. 4A-4P.

Figure 3A:
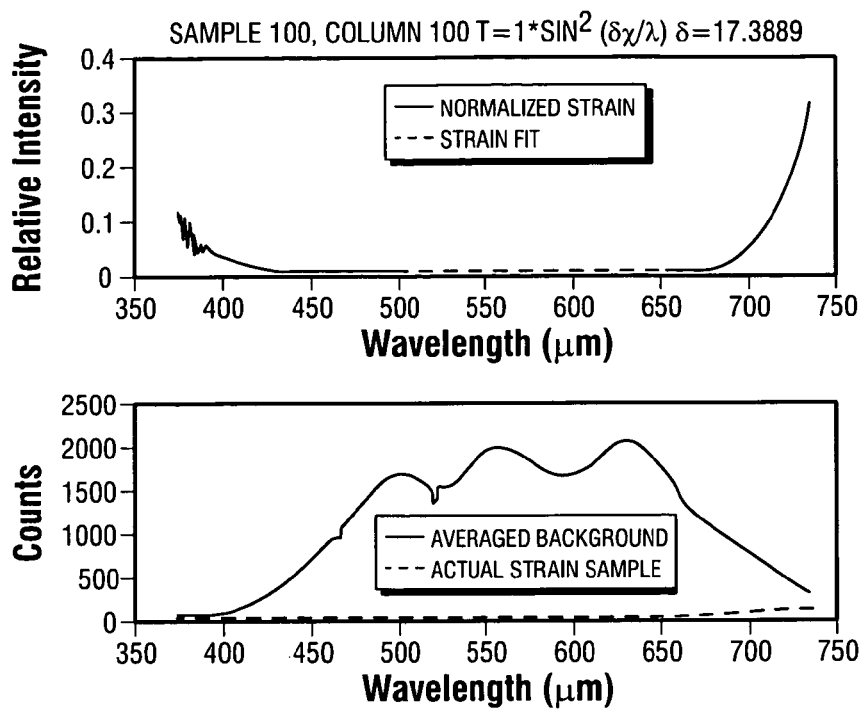
FIGS. 3A through 3P provide a series of graphs of data from a film under various known percent strain applied using a film tensioner, where the graphs are set out in pairs including a lower graph showing the average background intensity for a pixel and the spectrum obtained for that particular pixel and an upper graph showing the ratio of the two bottom plots and the fit used to determine the optical retardation.
Figure 3B:
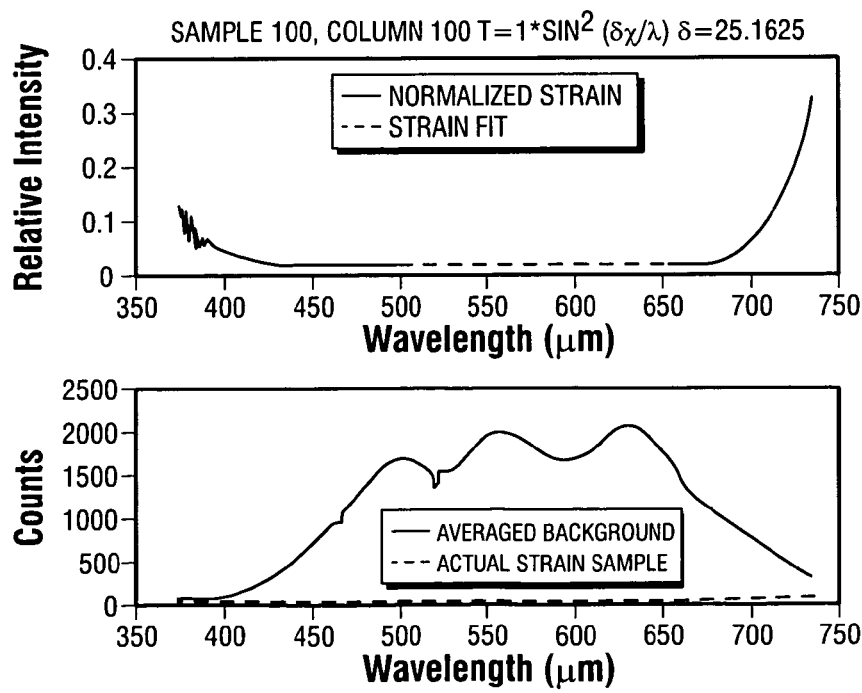
Figure 3C:
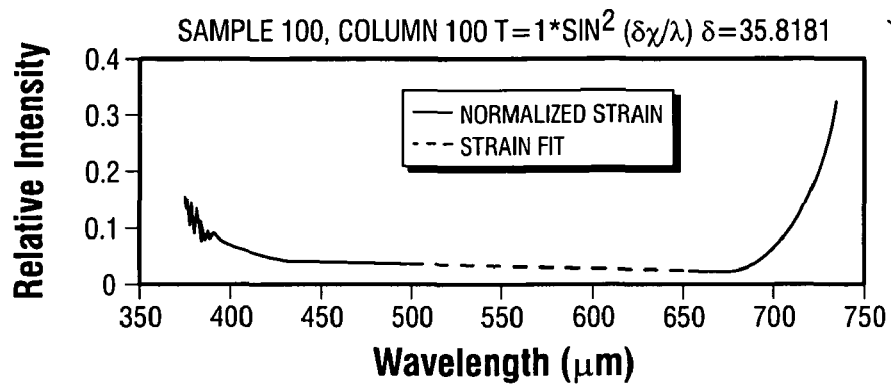
Figure 3C:
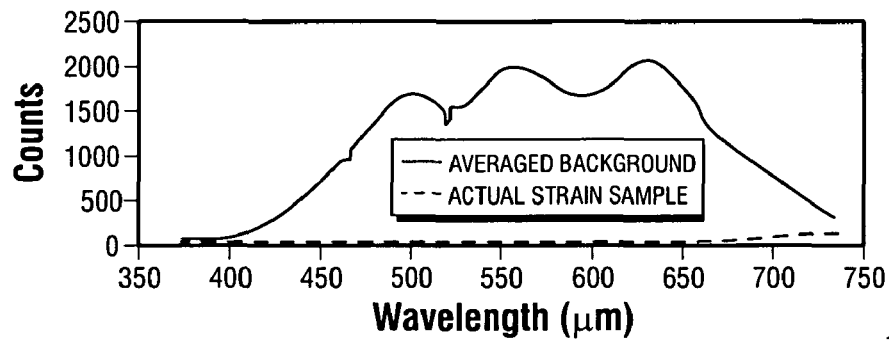
Figure 3D:
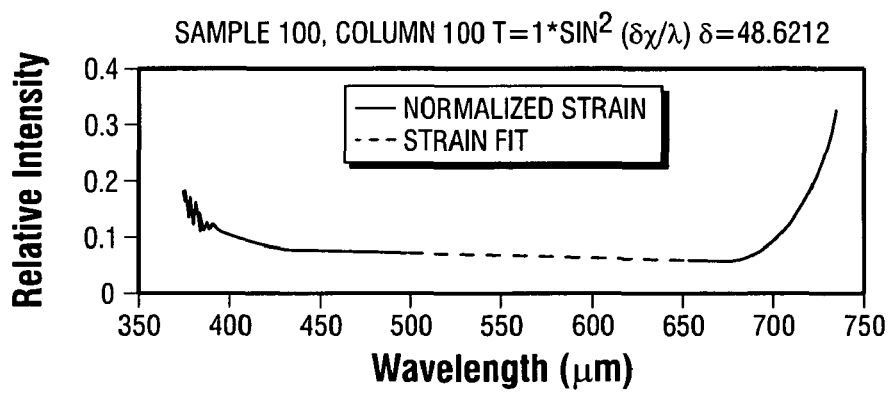
Figure 3D:
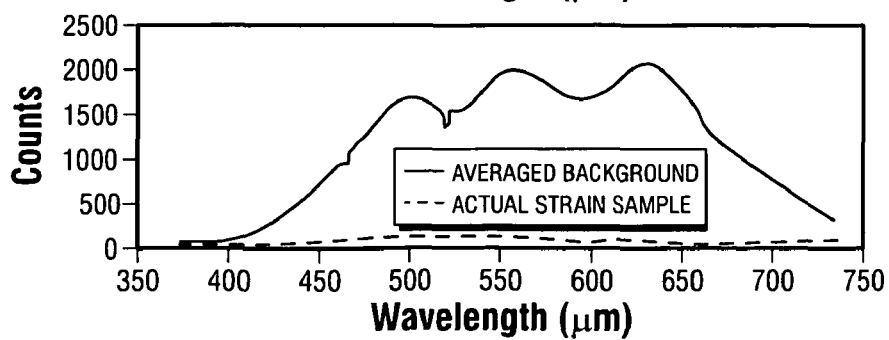
Figure 3E:
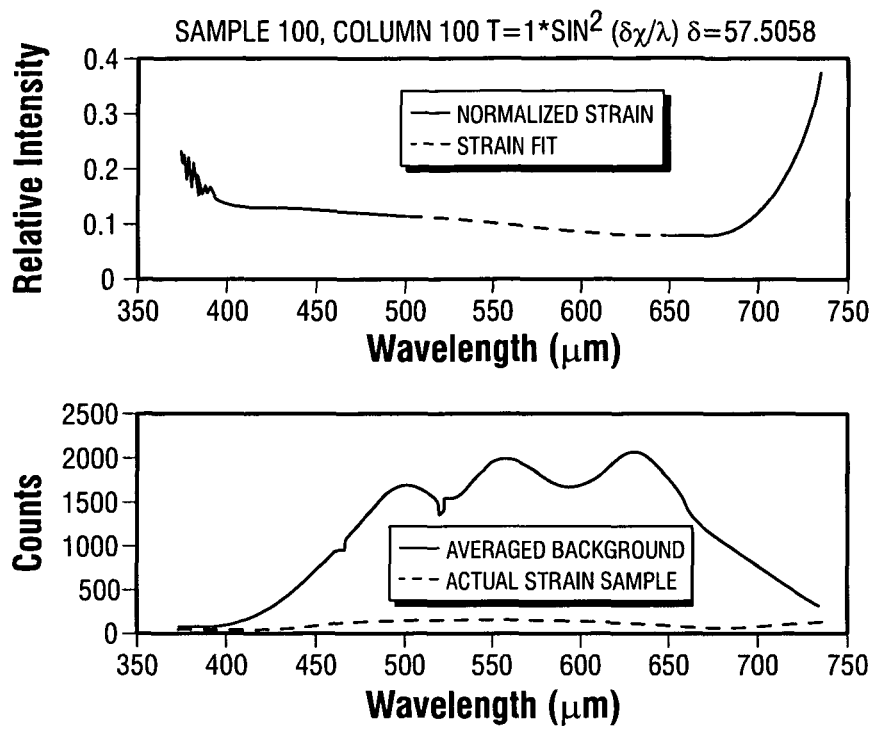
Figure 3F:
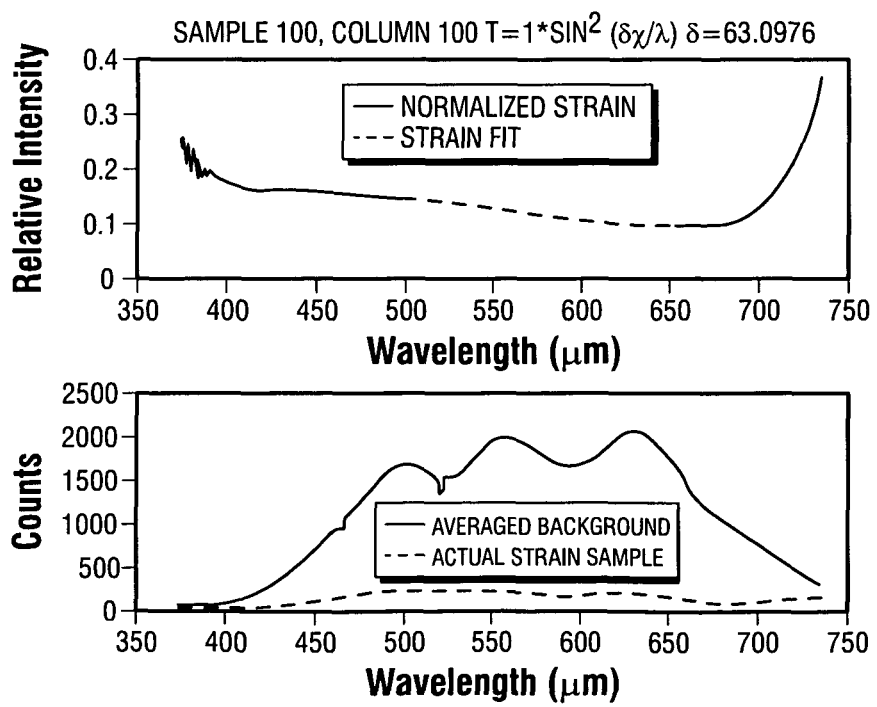
Figure 3G:
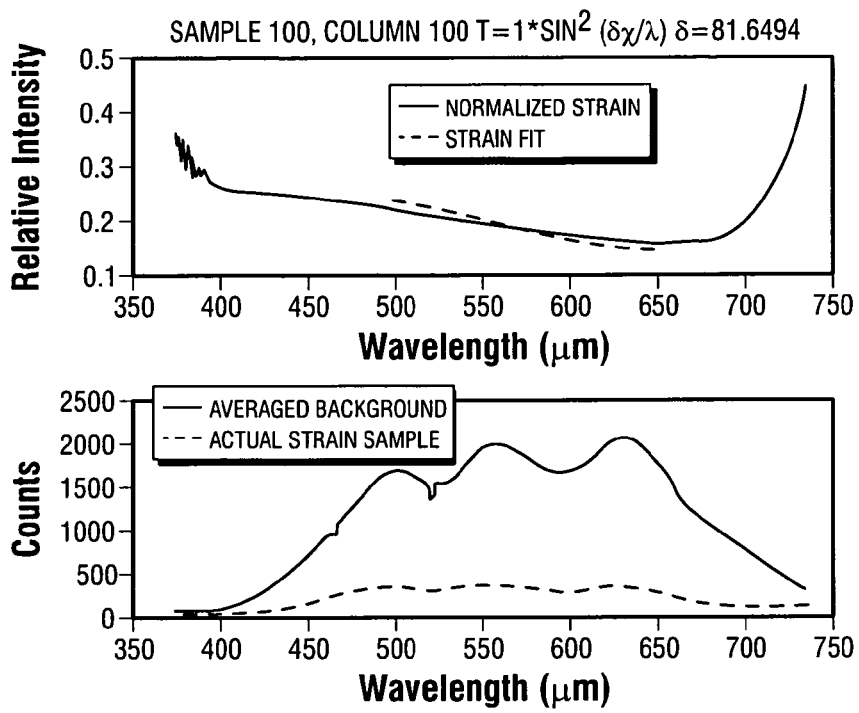
Figure 3H:
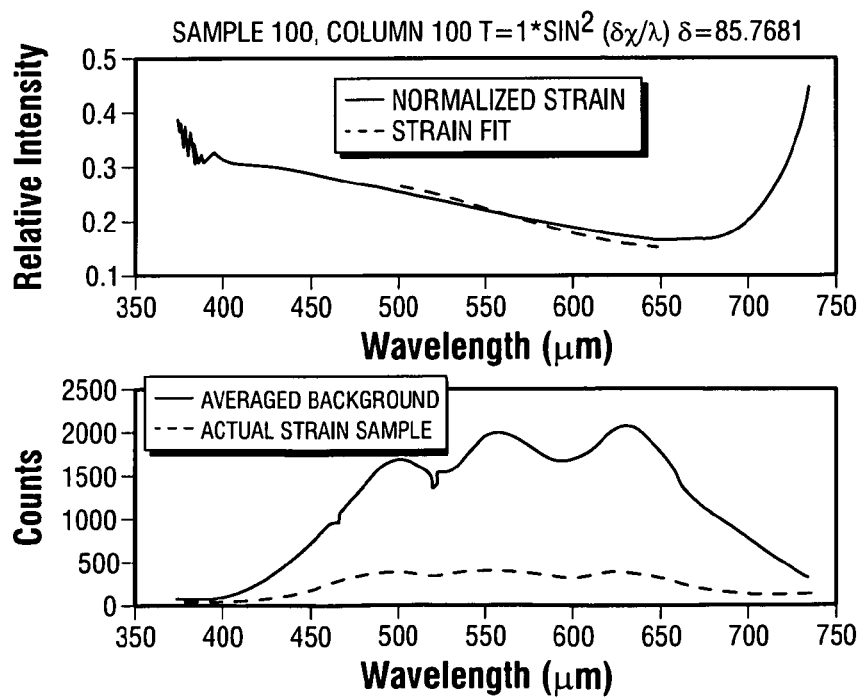
Figure 3I:
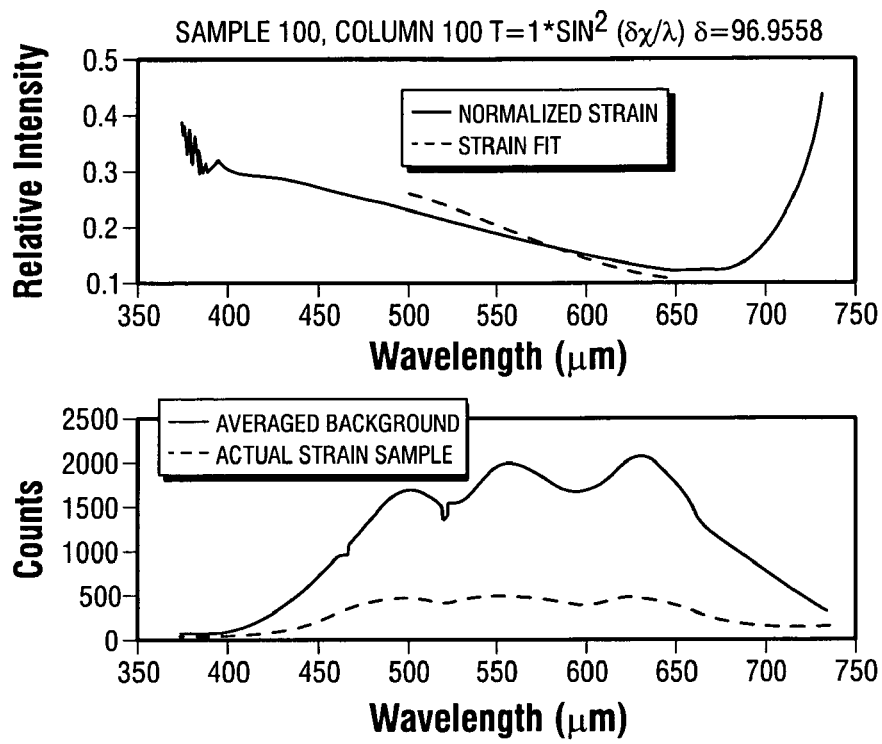
Figure 3J:
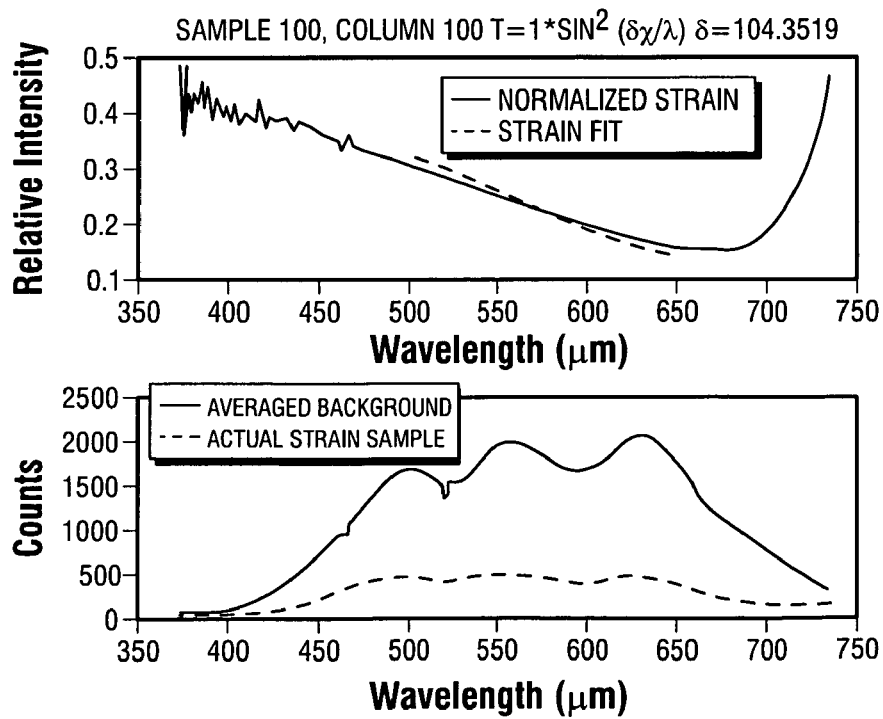
Figure 3K:
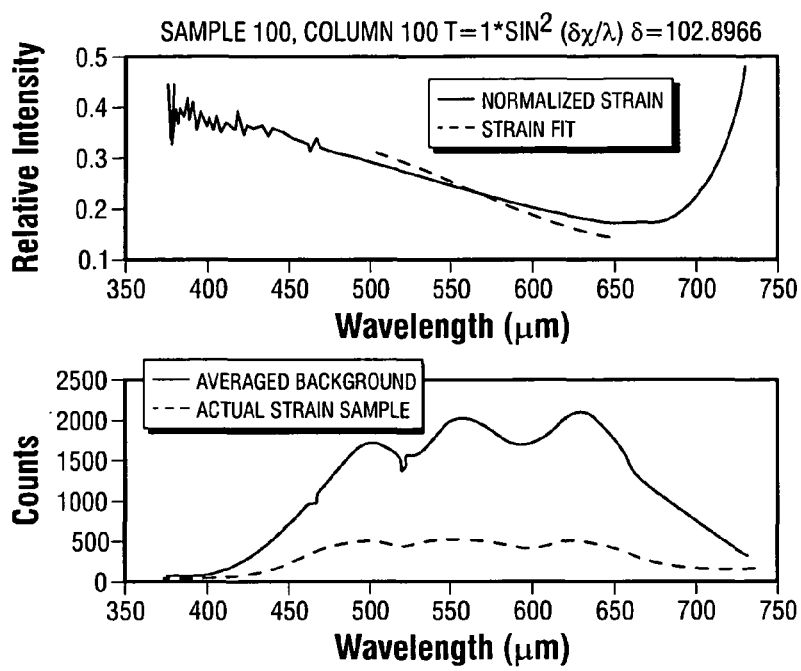
Figure 3L:
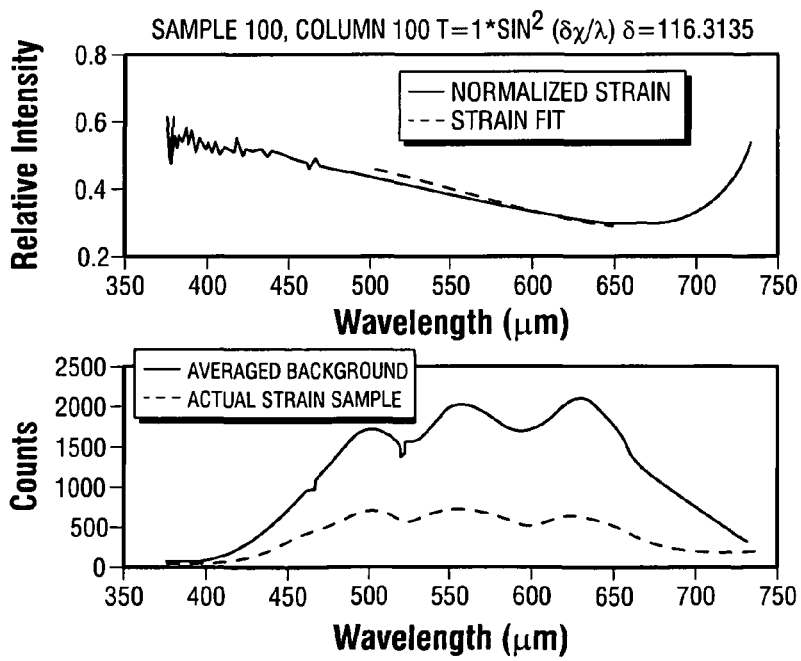
Figure 3M:
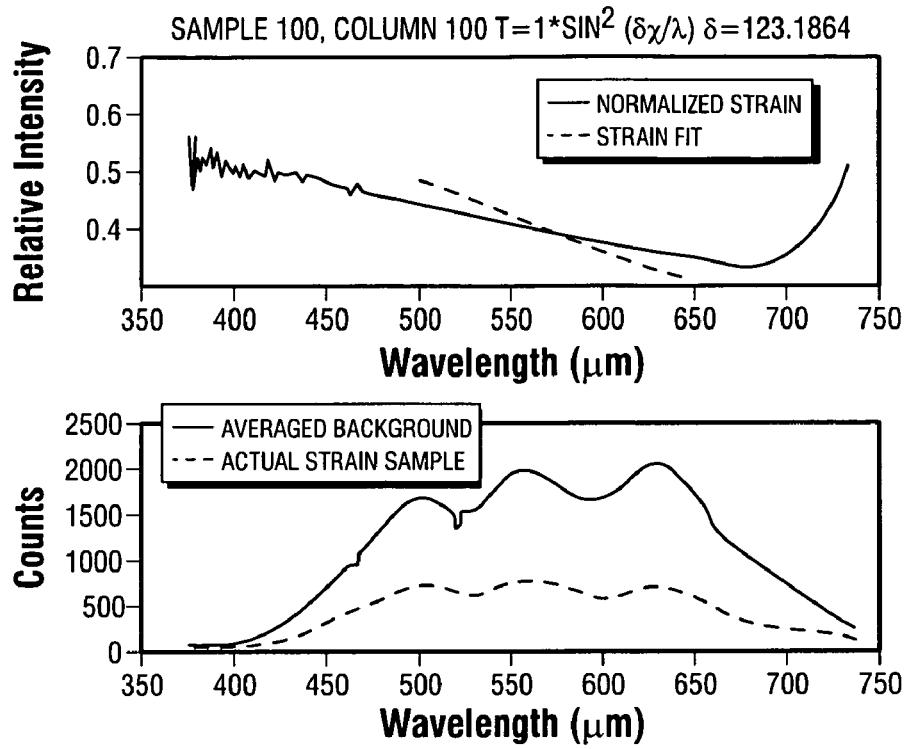
Figure 3N:
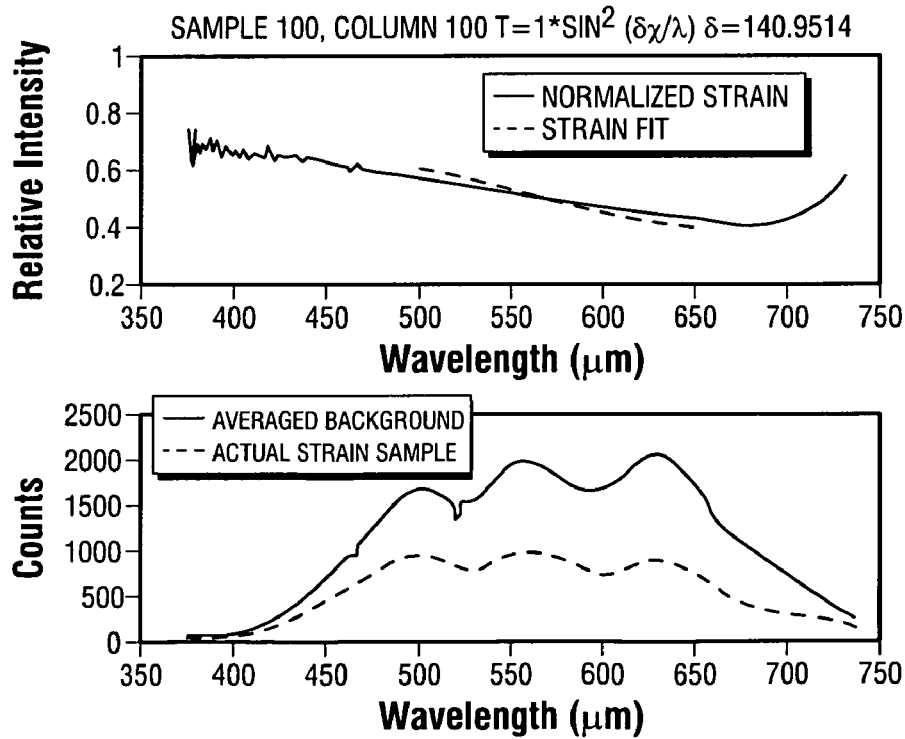
Figure 3O:
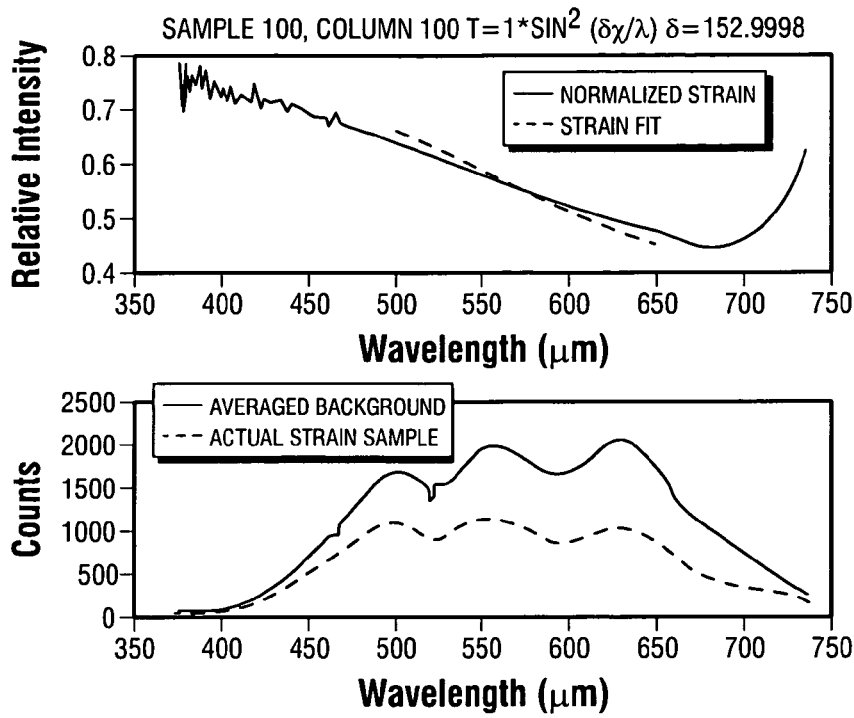
Figure 3P:
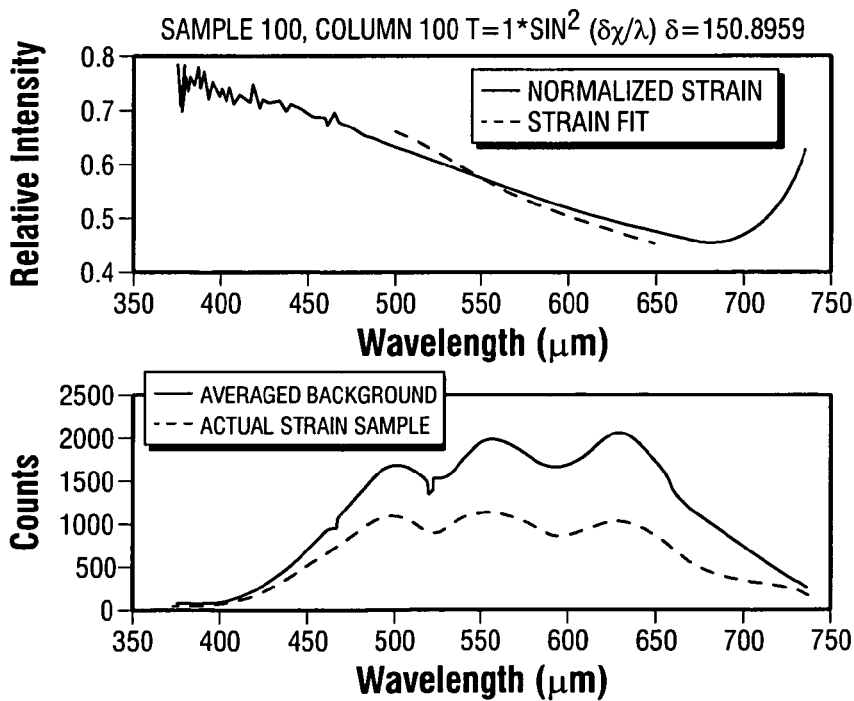

In the first set of plots shown in FIG. 3A, one pixel at the position of (100,100) near the center of the imaging region was arbitrarily chosen from the data cube for each strain value to indicate a representative recorded spectra and the automatic fit generated to determine optical retardation value. Most fits to the data appeared to be accurate and resulted in δ values that correlated well with expectation. Occasional fits deviated from the apparent best-fit, which added some noise to the resulting map of δ values. Often, this fitting deviation was the result of a localized intensity spike detected on the imaging CCD for a particular pixel, as was evident in the normalized spectra for the 8, 10, and 12% strain runs. Interference data for all relevant film strains was smooth and slowly-varying; therefore such localized spikes could be removed through post-processing by smoothing the data in software, thereby removing much of this noise.

Figure 4A:
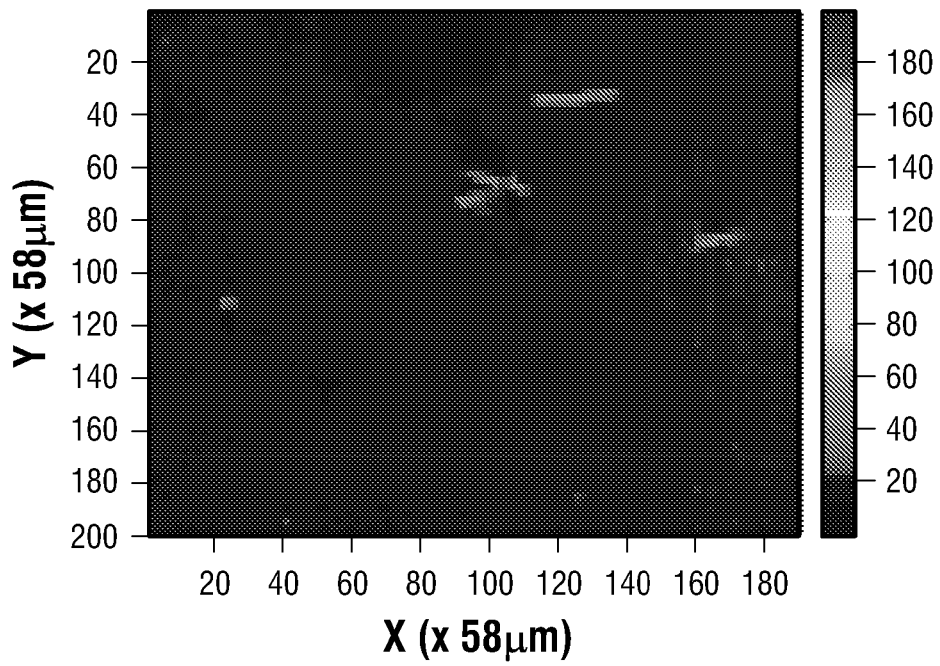
FIGS. 4A through 4P provide a series of optical retardation maps for uniformly strained Ultra Long Duration Balloon (ULDB) film under applied strain varying from 0 to 15% to indicate the relative change in retardation for each plot. Oriented as shown, the stretching force on the film is applied vertically. The minimum, average, and maximum optical retardation values are indicated above each plot.
Figure 4B:
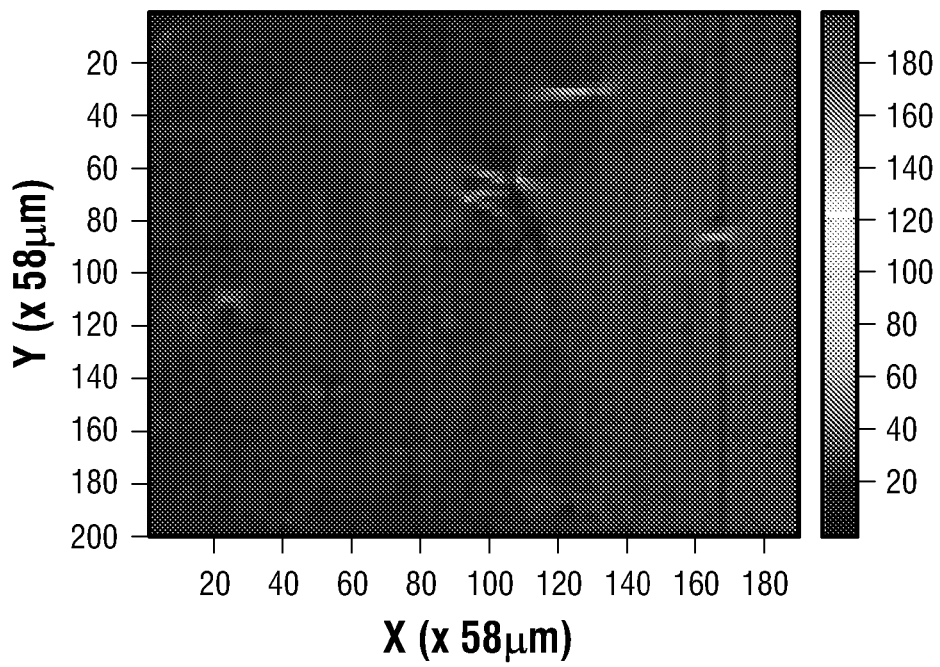
Figure 4C:
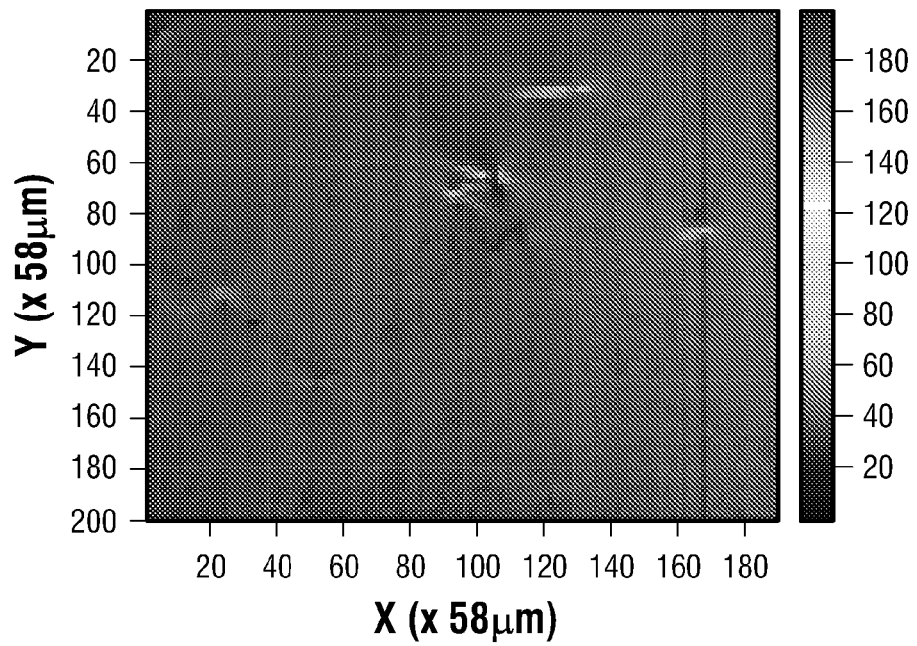
Figure 4D:
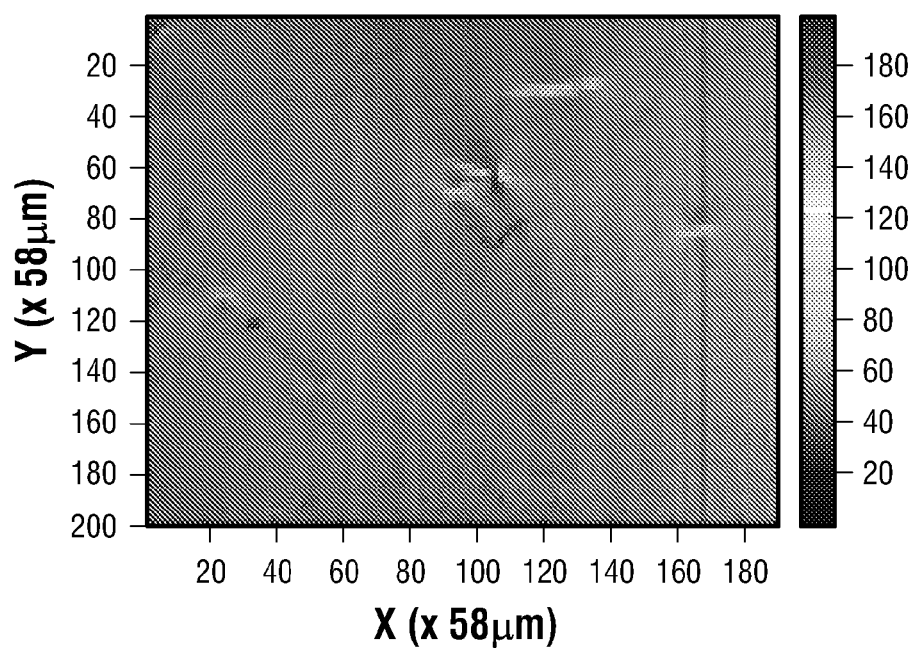
Figure 4E:
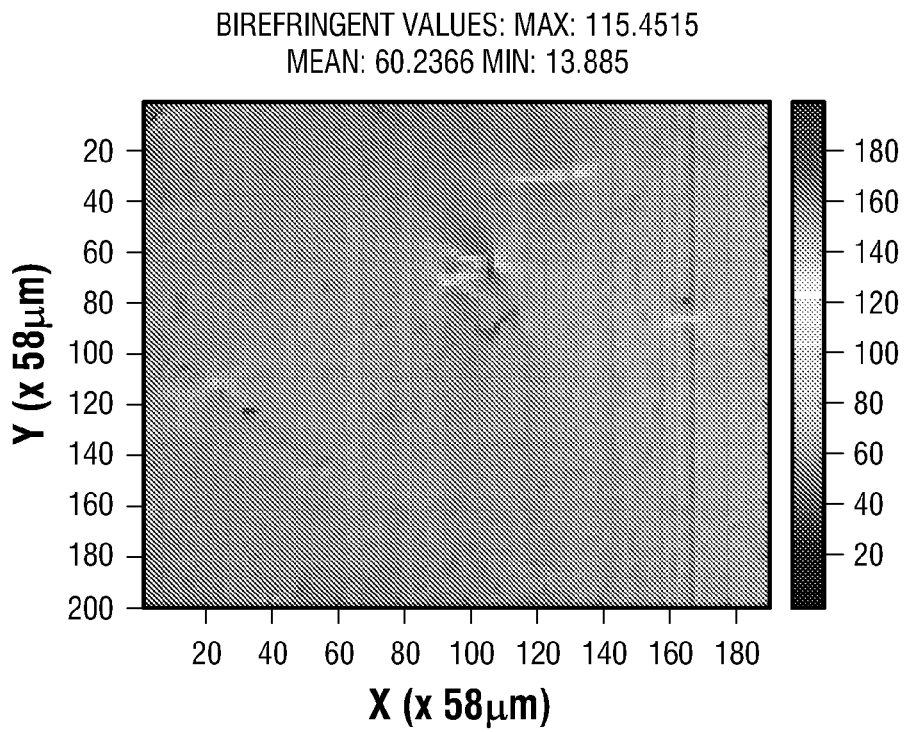
Figure 4F:
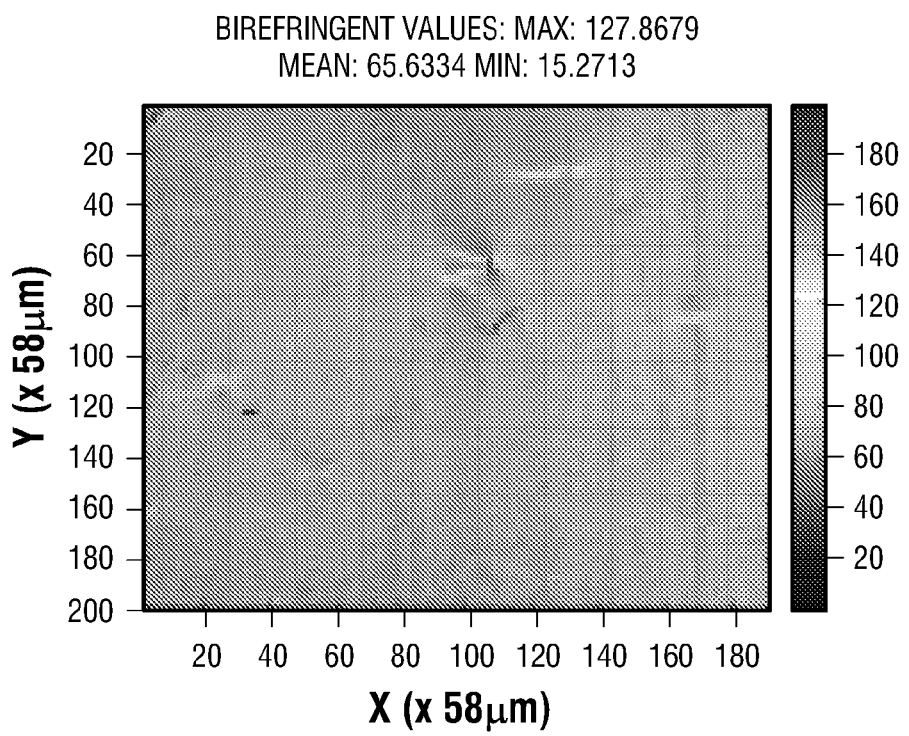
Figure 4G:
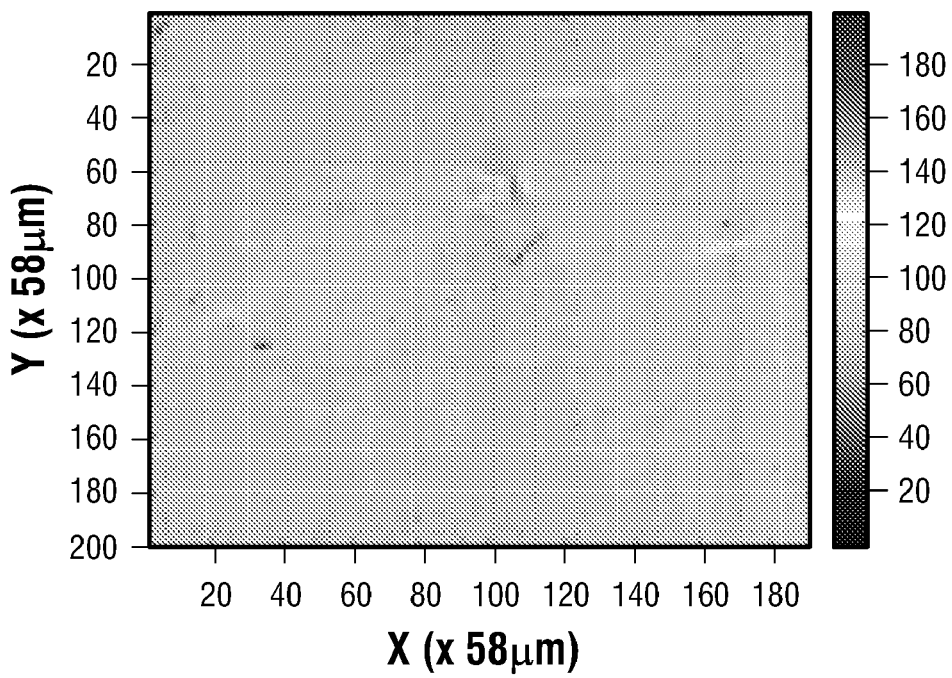
Figure 4H:
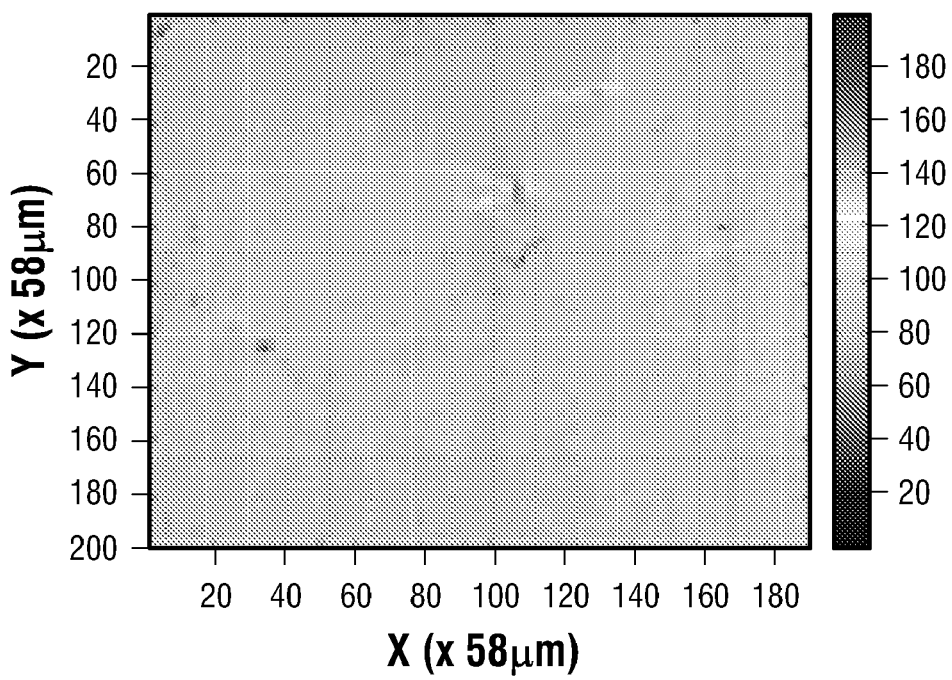
Figure 4I:
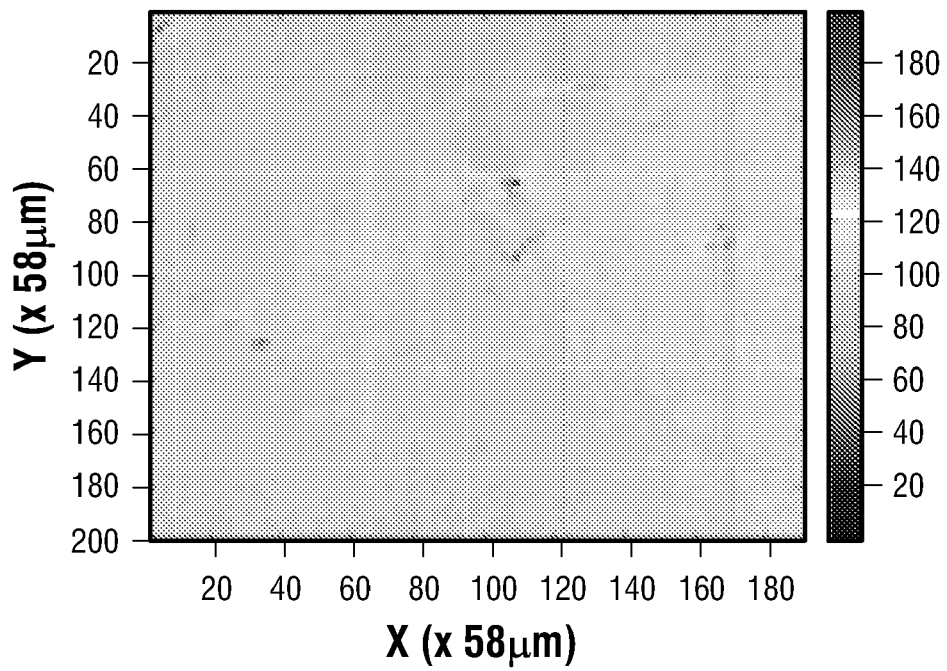
Figure 4J:
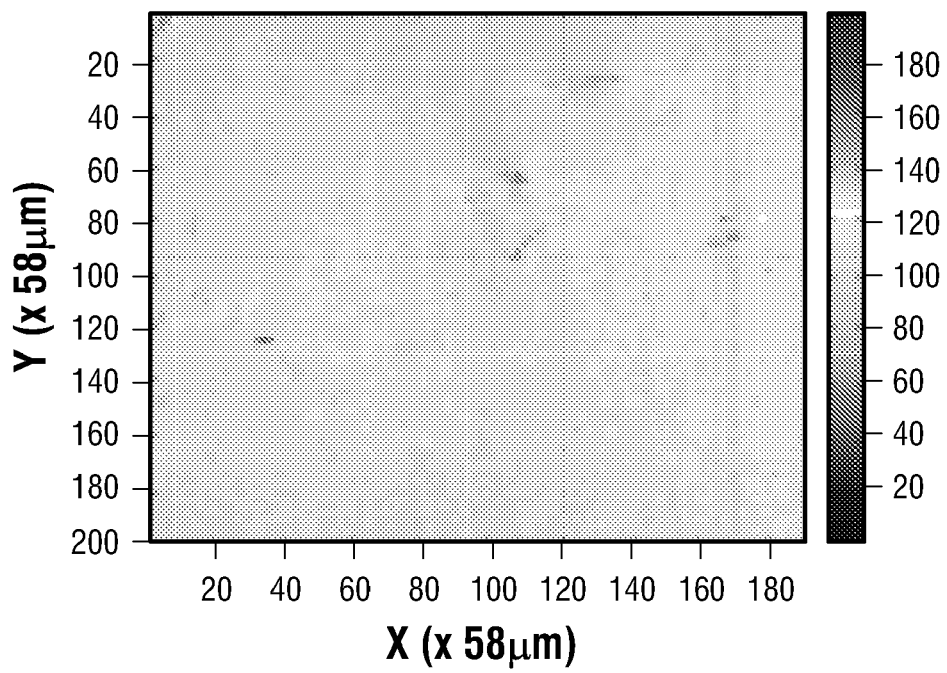
Figure 4K:
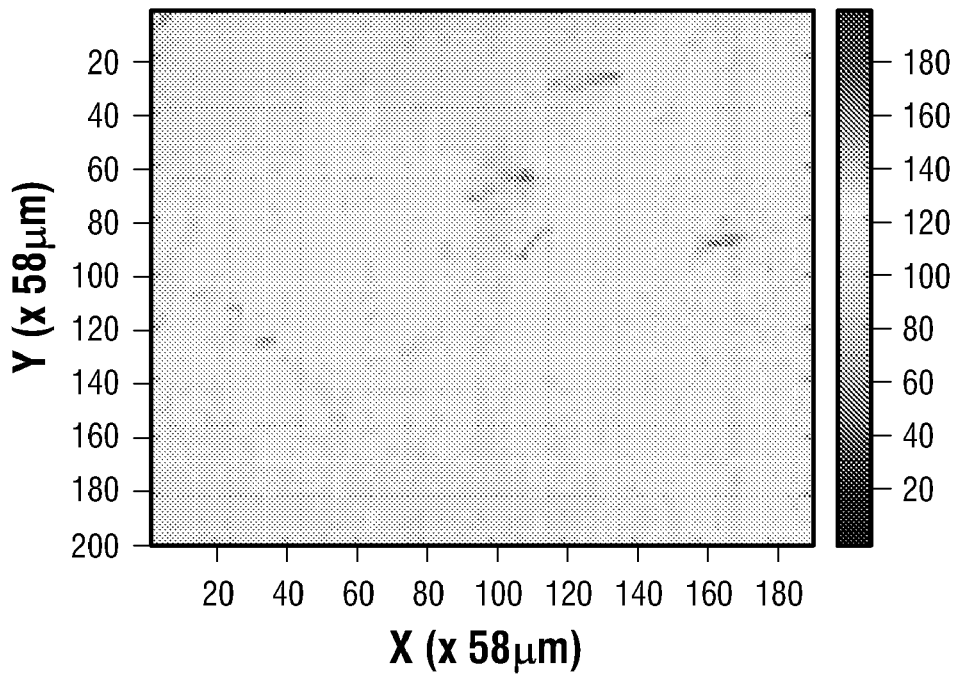
Figure 4L:
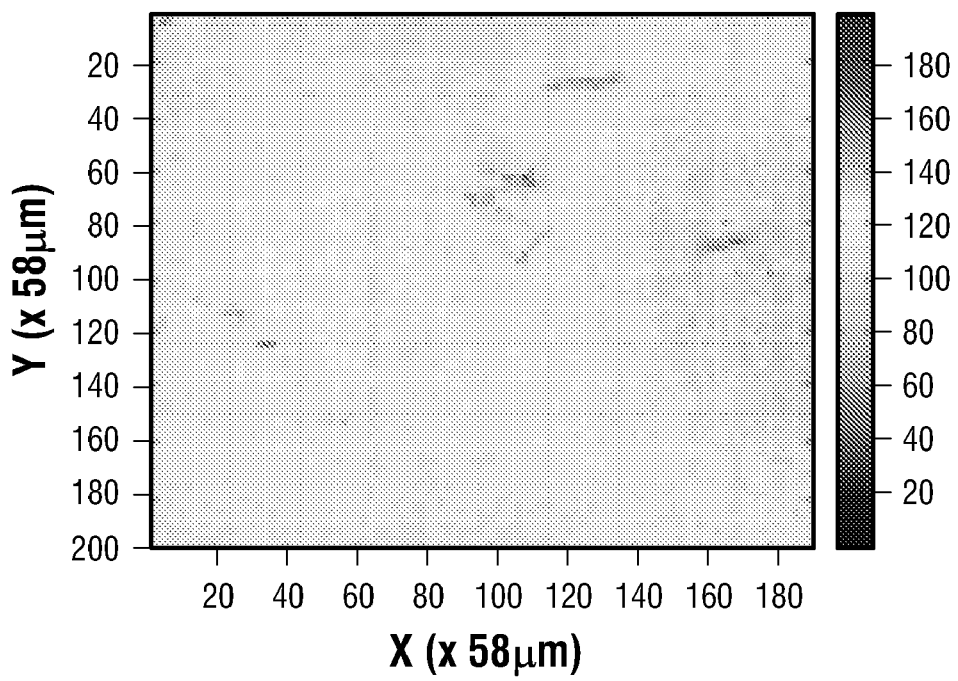
Figure 4M:
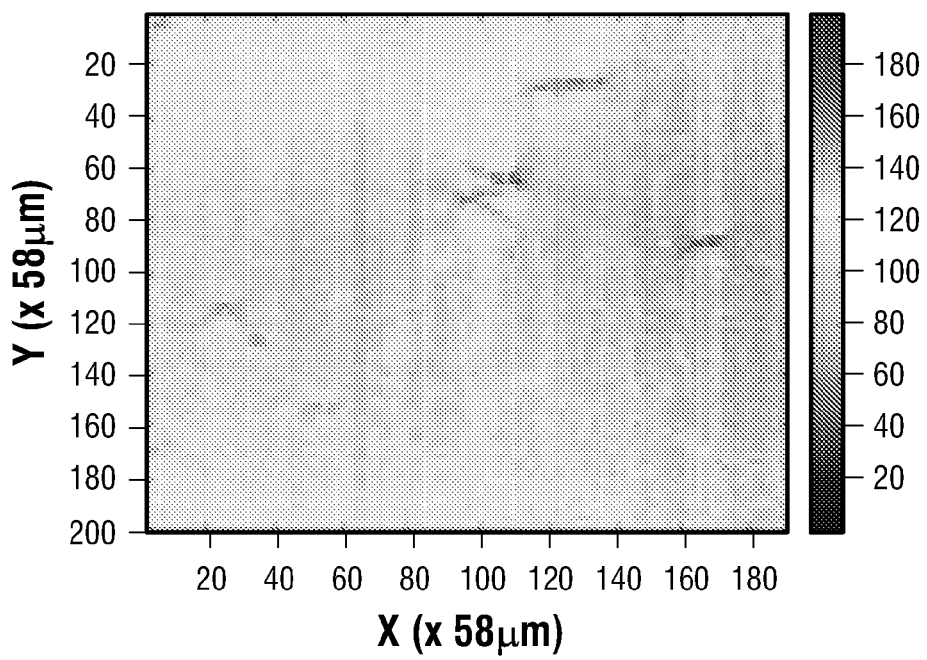
Figure 4N:
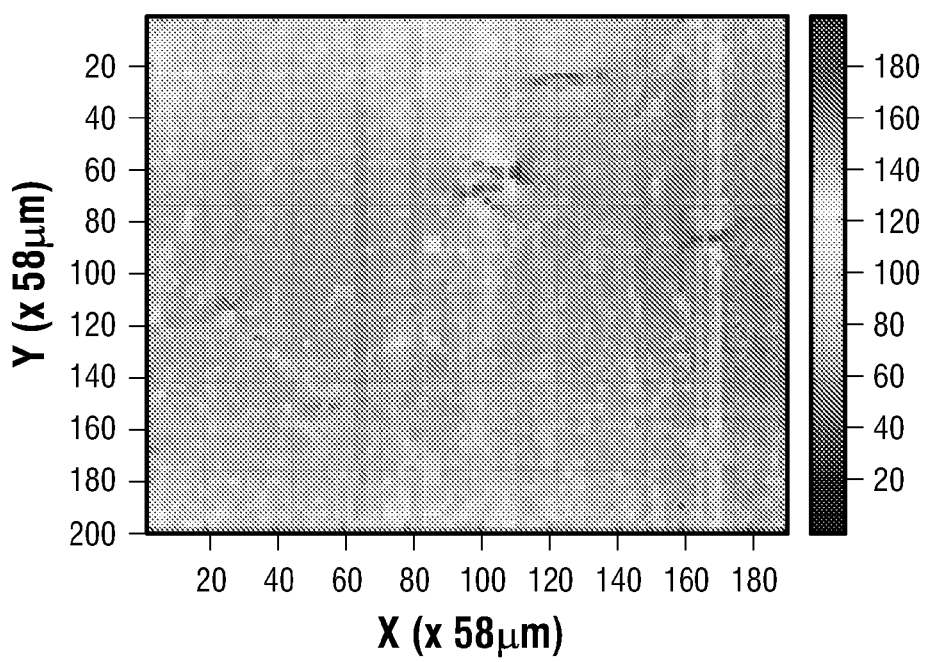
Figure 4O:
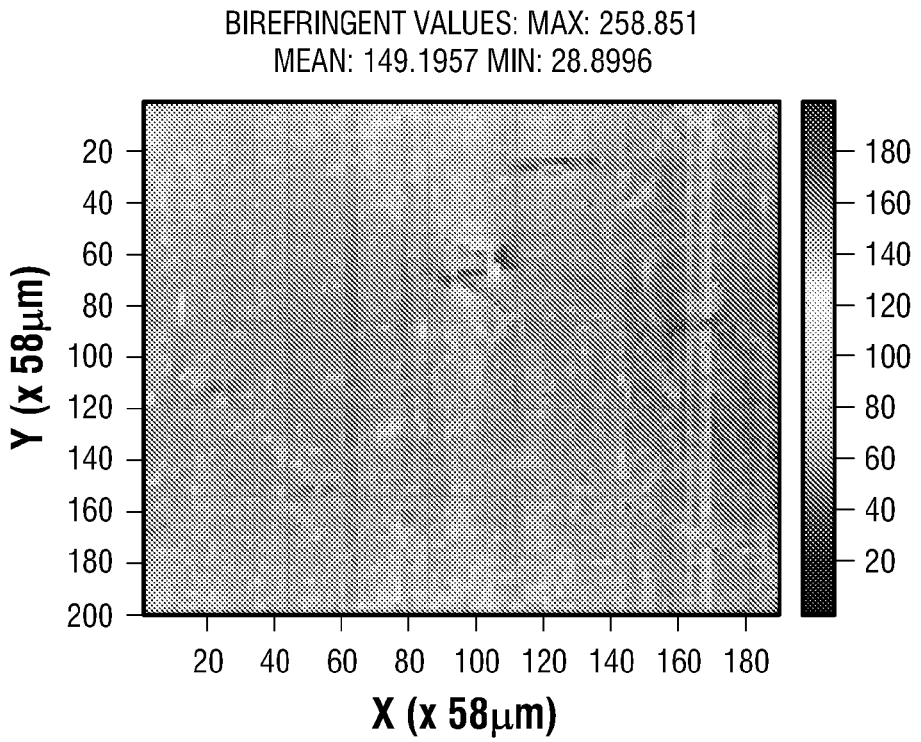
Figure 4P:
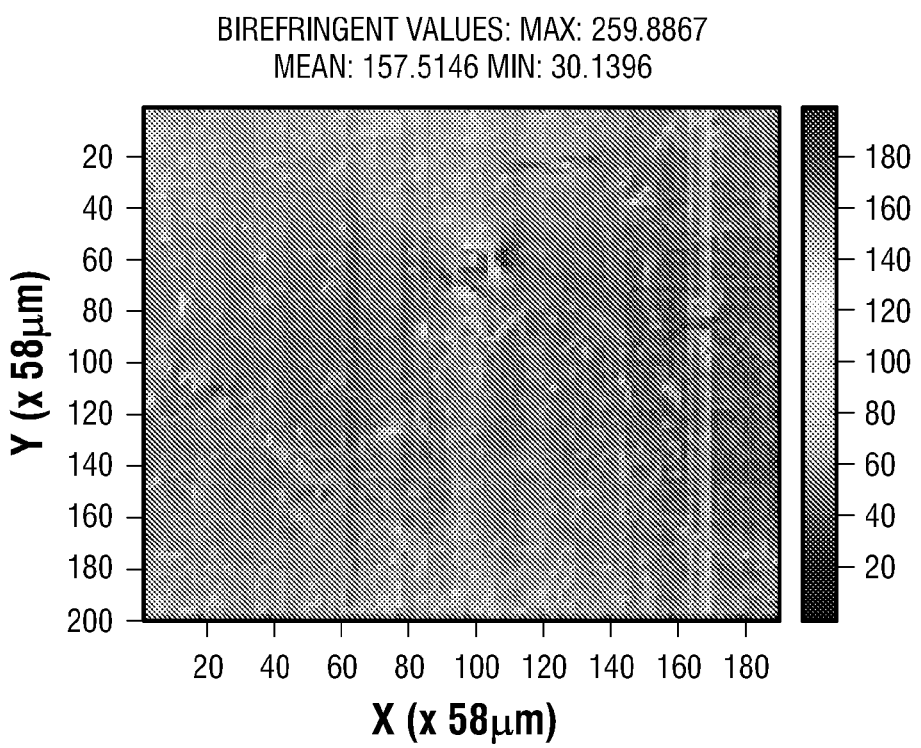

The full δ maps for these strain values are shown in FIGS. 4A to 4P. Each map area imaged was approximately 11.1 mm×11.6 mm and each imaging pixel covered an area roughly 58 μm×58 μm. The plots are all shown using the same scale to indicate relative values as the strain is increased. Although this limits the δ resolution on any one map, it does permit simpler comparative evaluation. As can be seen from the series of images, there are some minor weak points in the particular piece of film imaged. These may be due to a crease, for example, that the film might have experienced before imaging. No visible defects were apparent in the film either before or after imaging, however. Aside from these localized effects, the applied strain was fairly uniformly distributed across the film.

EXAMPLE 2

Correlation between Optical Retardation and Strain

Figure 5:
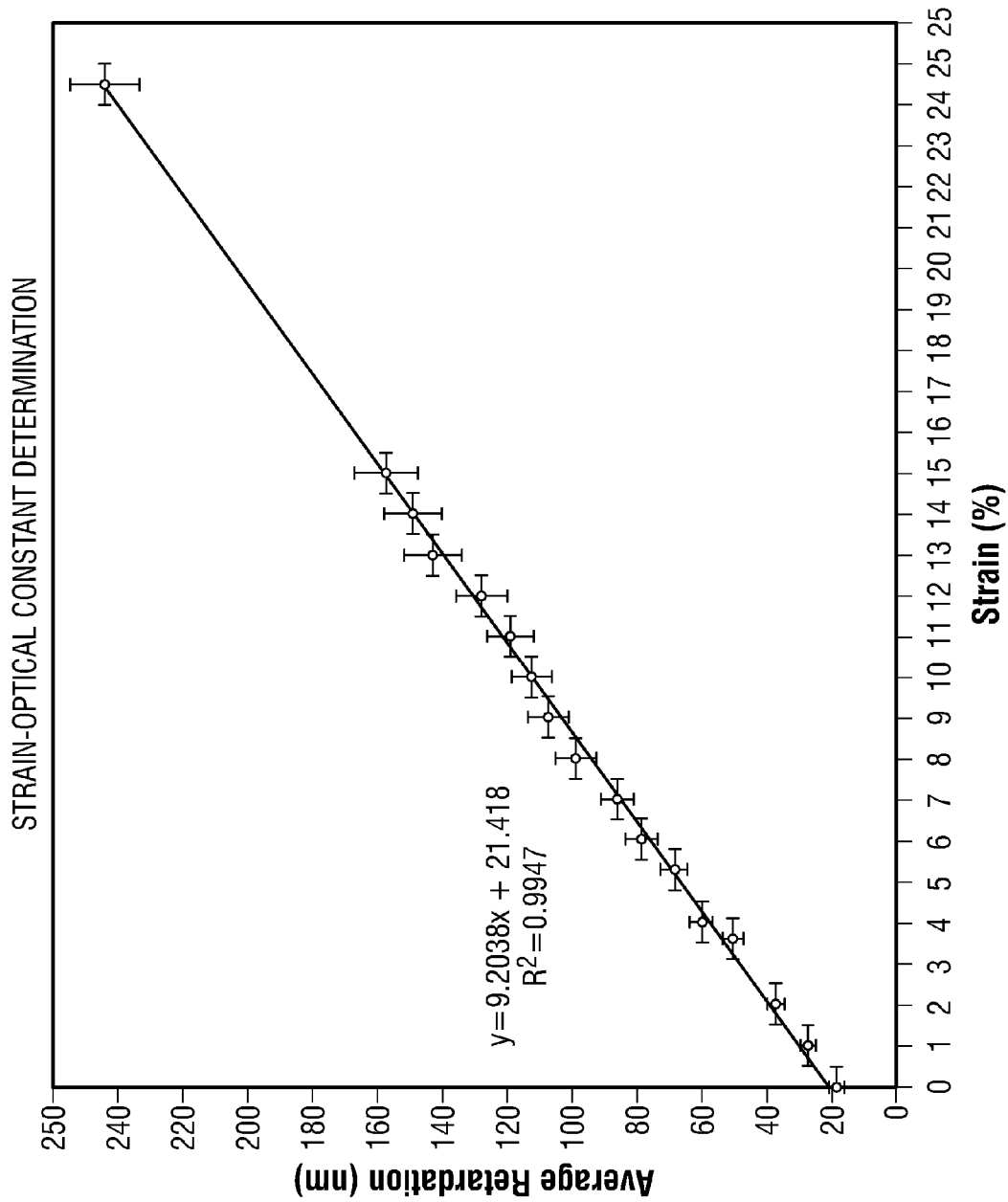
FIG. 5 is a graph illustrating the linear relationship between applied strain and average measured optical retardation.

To determine the relation between physical strain and measured optical retardation, the average optical retardation fit value obtained over an entire map was plotted as a function of strain applied for the collection of all strain maps obtained from 0 to 15% strain, as shown in FIG. 5. Vertical error bars shown are the standard deviation in δ measured on each map and the horizontal error bars are defined by the uncertainty in relative inter-clamp distance in the film tensioner. Note that an increase of 1% strain corresponds to only a 0.005" distance increase between the tensioner clamps. This distance was difficult to control and measure to mil accuracy using the thumb wheels on the tensioner and an external caliper.

From this plot, the strain-optic ratio determined is [retardation (nm)/% strain]=9.2±0.3. The apparent linear offset in the data was determined to be due to a measurement artifact, rather than residual stress in the film. When film was clamped into the film tensioner, it would become slightly taut when the clamping screws were tightened. This imparted some initial strain to the film before the clamps were moved. Separate measurement of unclamped, unstrained film confirmed that the optical retardation of unstrained ULDB film is zero to within measurement uncertainty.

To confirm these results, additional measurements were then recorded on other pieces of ULDB film, taken from well-separated sections of one large ULDB film sample. These measurements demonstrated the measurement repeatability that the instrument and analysis method are capable of. By compiling the results from all three analyses, a weighted average of the strain-optical constant for ULDB film was obtained. The results for each of the three data sets were: 9.2±0.2 nm, 9.1±0.4 nm, and 8.8±0.4 nm. Therefore, the composite weighted average for all measurements was 9.1±0.2 nm, indicating an error within 3%. Based on these results, the ULDB film has been analyzed to produce real strain maps, as shown in the following section.

EXAMPLE 3

Film Strain Map

Figure 6:
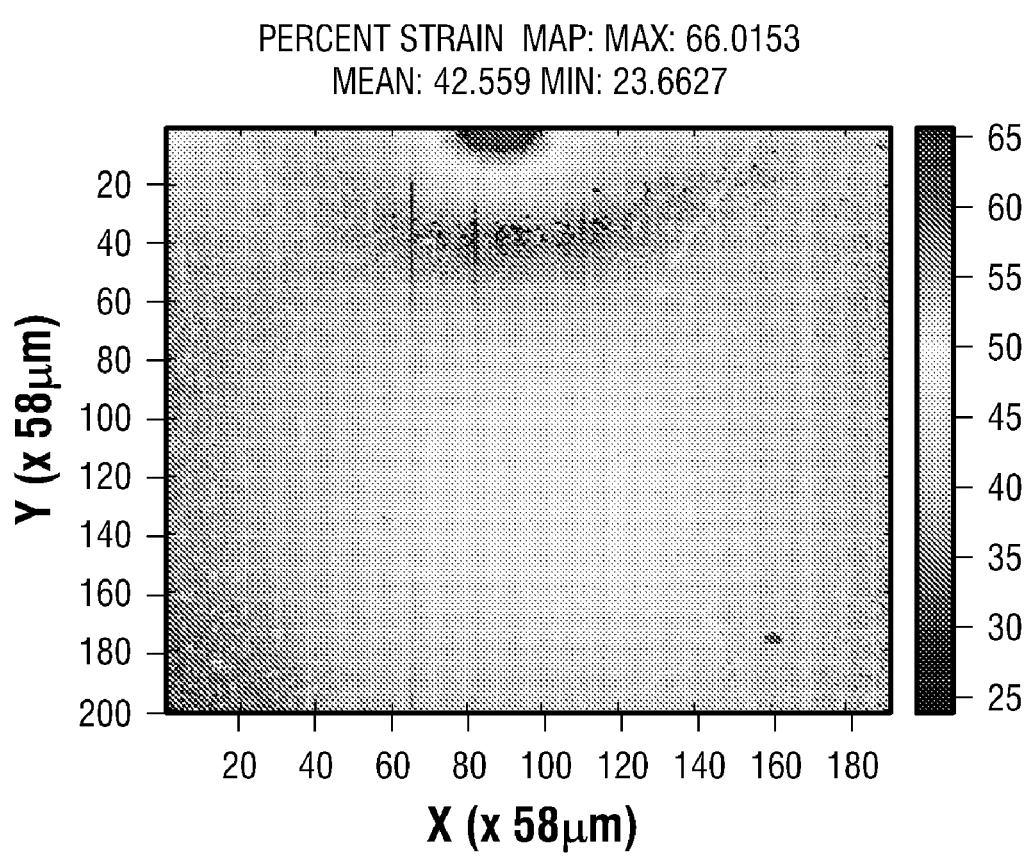
FIG. 6 is a strain map of a high-strain area of a non-uniformly (25%-65%) strained polyethylene film.
Figure 7A:
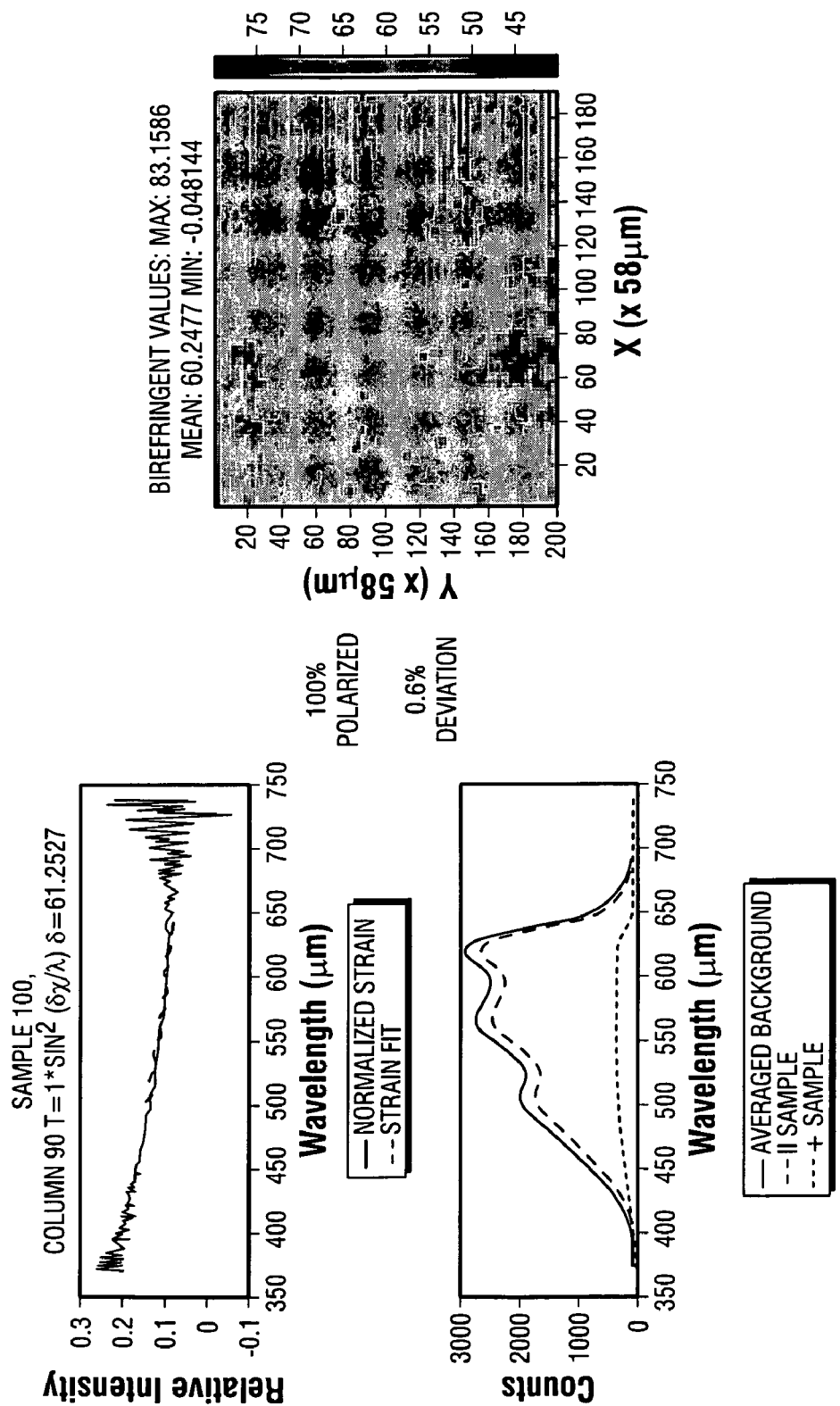
FIGS. 7A through 7D provides a series of four optical retardation maps of one strained section of ULDB film obtained under various percentages of linearly polarized light intensity out of total light intensity passing through the film. For each set of data, consisting of the analysis for pixel (100, 90) and the complete retardation map, the light polarization fraction and mean retardation deviation is indicated. The deviation is calculated relative to the mean obtained from measurement of the film under 100% polarized light using only the crossed polarizer and background data. Note that a minimum fraction of polarized light is necessary to image the film, as indicated by the non-converging results obtained using 25% polarized light.
Figure 7B:
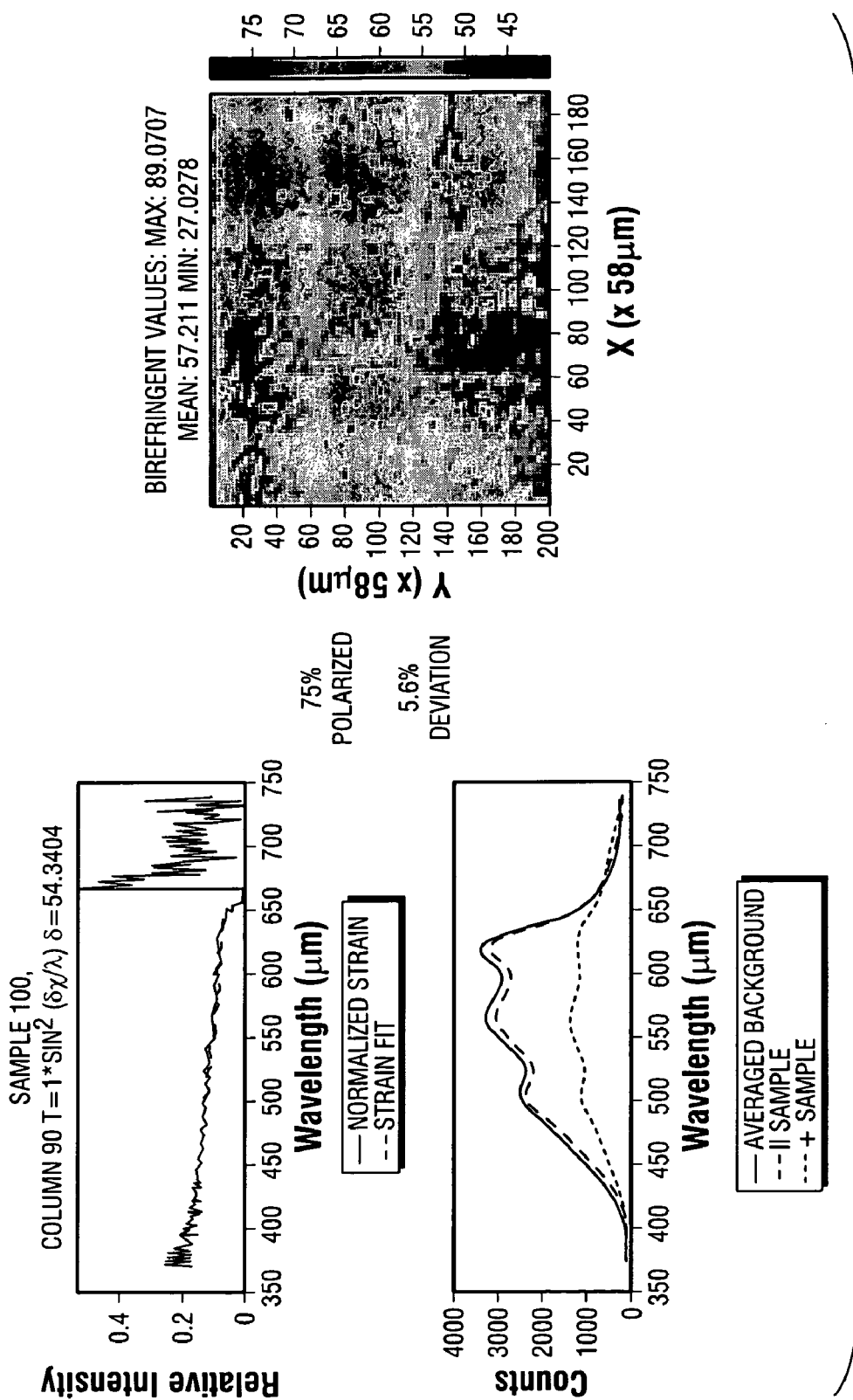
Figure 7C:
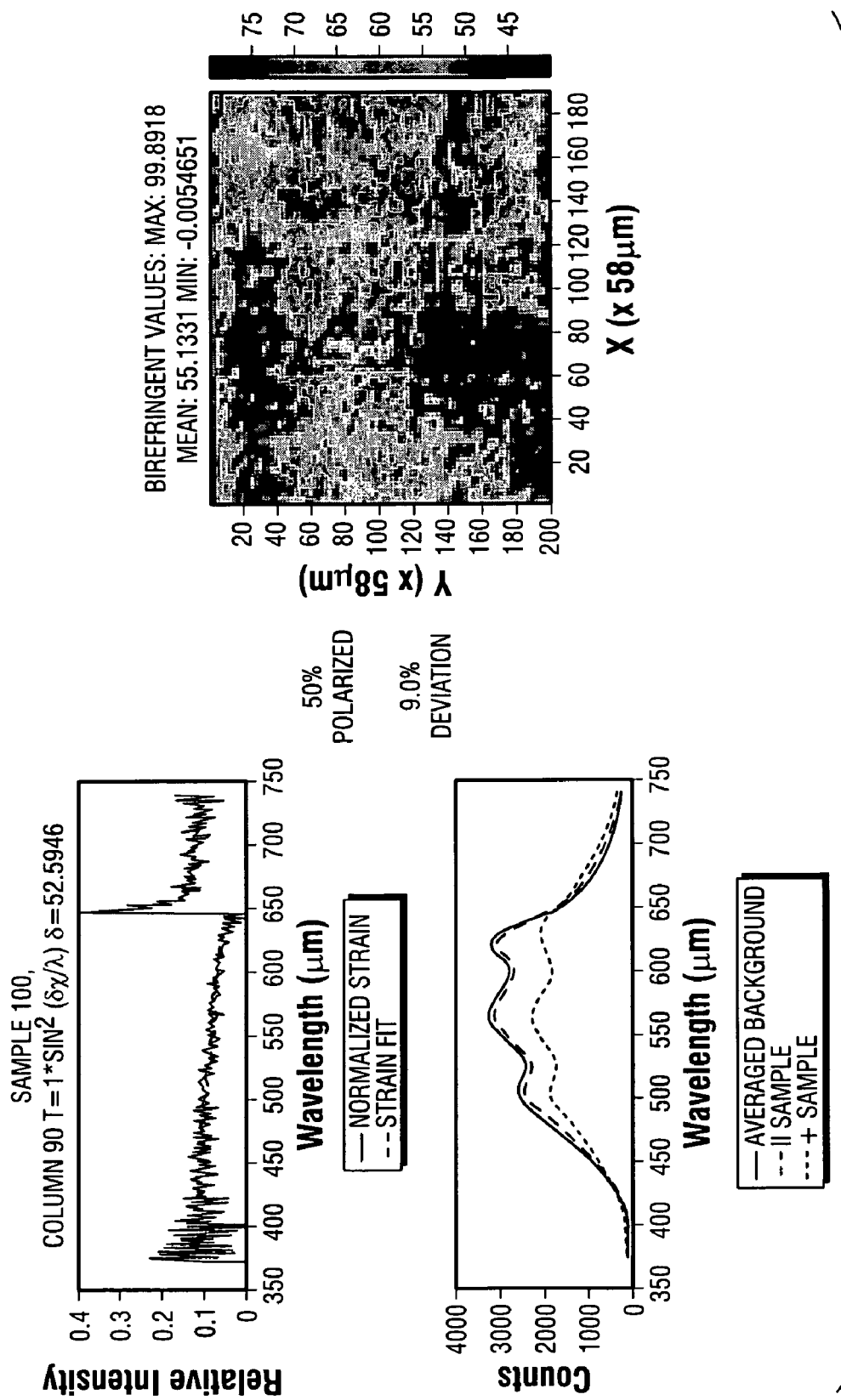
Figure 7D:
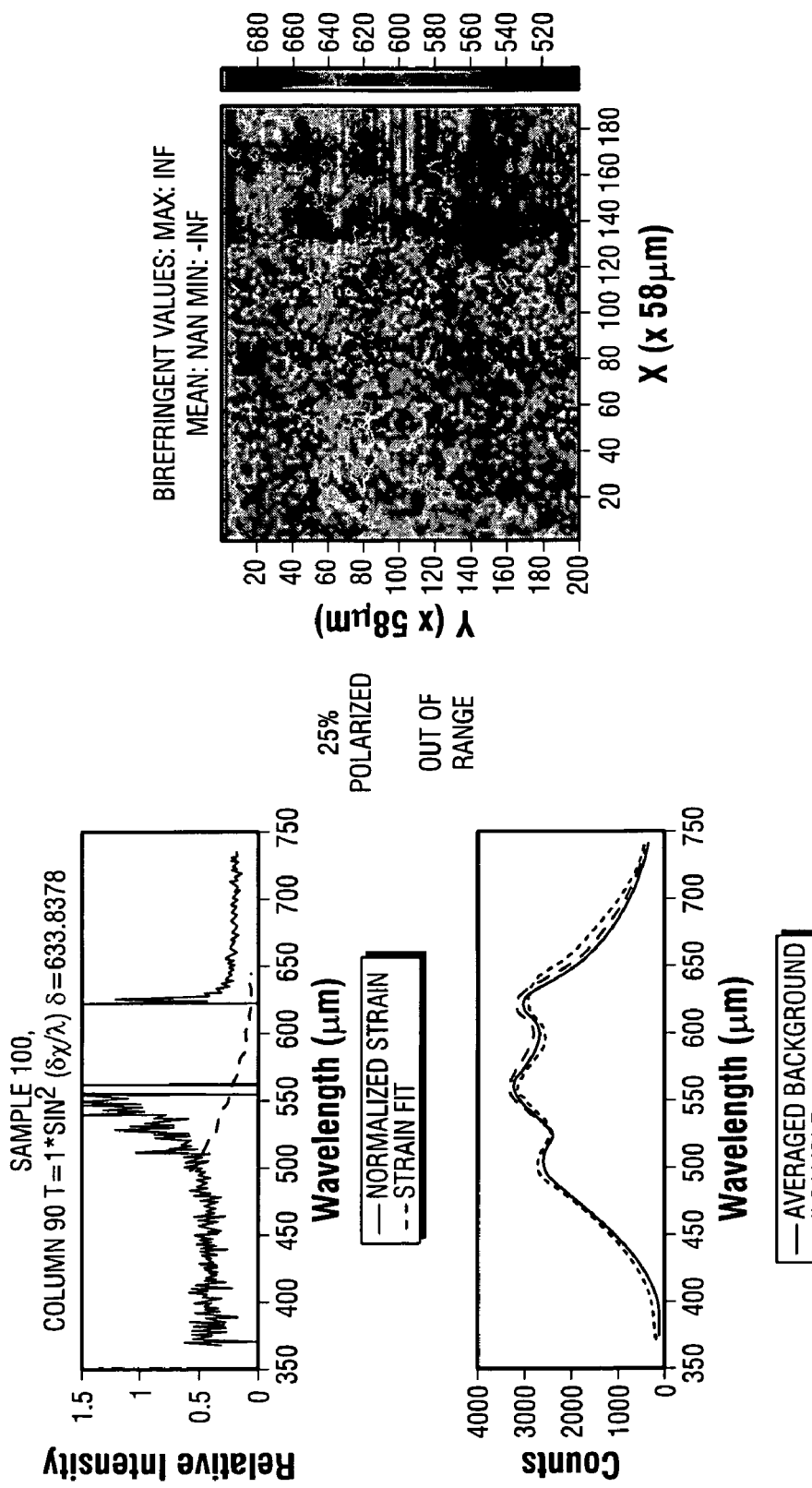

Calibrated strain maps, such as the one shown in FIG. 6, demonstrate the capability of the hyperspectral polarimeter to precisely measure complex film strain, as might be found in a ULDB. The film represented in this image was a narrow strip which was non-uniformly deformed in order to evaluate the HP. In the orientation displayed, one clamp was just above the top of the image. The strain was distributed in a pattern typically seen during previous calibration attempts in which edge effects would dominate the strain distribution. There was high strain near the center of the film with sharp strain spikes near the clamping surface. This explains the behavior seen earlier where apparent strain values far exceeded the average distributed strain applied to a film. This data strongly indicates that the HP is a feasible technology for the ULDB platform.

EXAMPLE 4

Measurements Using Fractionally Polarized Light

The HP was used to take measurements with fractionally polarized light in order to determine the polarization fraction required for accurate measurements of strain. The intensities of the polarized source shown and the white light source could be varied independently to produce any polarization fraction from 0 to 1, although the uncertainty in the polarization fraction using this method was approximately ±10%. A polarized light source and a beam splitter were positioned so that polarization resulting from the beam splitter reflection was parallel to the polarization from the polarized light source. Therefore, one light source provided nearly 100% polarized light and the other provided almost 0% polarized light. This experimental configuration was used to collect the measurements below.

The two light sources used for these measurements had different spectral profiles and the method of mixing the two beams resulted in spatial non-uniformity across the film area measured. However, because the algebra used for analysis is insensitive to these types of variation, accurate strain maps were still obtained. The strain measurement results using 100%, 75%, 50%, and 25% polarized light are shown in FIG. 7A-7D, respectively.

The data shown were all recorded from the same piece of ULDB film in the same strain state. The only difference between measurements was the fraction of polarized light used during imaging. For each data set, the calculations to obtain the retardation interference pattern are shown graphically for pixel (100,90), as well as the complete retardation map obtained from the data set. Notice that in each of the lower plots for pixel (100,90), three curves are now shown, corresponding to the spectra obtained for the background, as well as strained film between crossed and parallel polarizers. To evaluate the data, the retardation maps were compared to the maps obtained in 100% polarized light, using the original analysis equation which took only the background and cross-polarized data as input. The deviation of the mean retardation value for each map from the mean retardation obtained through the original equation is indicated.

The signal-to-noise ratio (SNR) for the computed spectra decreases with decreasing polarization fraction. As a result, measurements in fractionally polarized light are more inaccurate than measurements taken with fully polarized light. If the fraction is low enough, the fitting equation will not converge accurately, as seen in the 25% polarized light data. Note from the pixel plots for the 25% polarization data, however, that it is not inherently the SNR but, rather, a crossing between the background, parallel, and crossed data sets which caused the computed interference spectrum to be ill-behaved. Recall that if $2B-T_+-T_==0$, then the computed interference spectrum (A) is undefined. If all three data sets could be taken nearly simultaneously, on the timescale of background fluctuations, this crossing behavior would not occur and accurate retardation maps could be obtained at a lower polarization fraction.

In one embodiment, the background measurement may be replaced with a hyperspectral measurement taken with the polarizers oriented at 45° to one another. This approach will also produce a background spectrum for each pixel which will be obtained at the time of measurement.

Implementation in a Balloon

It has been known for almost two centuries and explained for well over a century that sunlight which has been scattered off of the atmosphere is plane polarized. On the ground, the degree and orientation of polarization varies with the position of the sun and atmospheric conditions. At sea level, polarizations of 75% can be reached in the morning and evening, when sunlight is maximally scattered. As shown in FIG. 1, light 30 from the sun 32 that has scattered from the atmosphere 34 becomes linearly polarized when viewed from a 90° scattering angle. This polarization can also be used to analyze the strain in balloon films.

As noted above, the polarization of skylight is at a maximum at an angle of 90° to the sun with a band extending on either side of this arc sufficiently polarized to be useful. As a result of this geometrical limitation it is not practical to image the entire surface of the balloon (ULDB) at one time. However, balloons typically rotate at a slow rate of less than 60°/min. at float altitude; as the balloon rotates its entire surface will pass between the centrally located imager and the arc of maximum polarization. The polarizer will be capable of rotating with respect to the imaging device. This rotation can be used to match the angle on the polarizer with the sun and hold it fixed to examine the balloon as each section passes over the arc of maximum polarization. This approach will work with almost any rotation rate. At higher rotation rates it may be more effective to target a specific section of film and capture a quick series of image slices when it passes through the optimal location. After an image slice is obtained, the HP is rotated slightly and another slice is collected.

In each of these approaches a series of images are collected, each of which has a portion of the balloon properly aligned for examination. The HP can zoom into one section of film for detailed analysis of a gore, or pan out to scan a broad area. An image of the entire balloon is obtained by stitching together the desirable portion of each of the multiple images obtained. The overall image can be analyzed for evidence of excessive strain, either over large areas or at small point defects. Images may be stored for comparison with later images to detect gradual changes, or transmitted to a ground station for further analysis, either automatically or manually.

Figure 8:
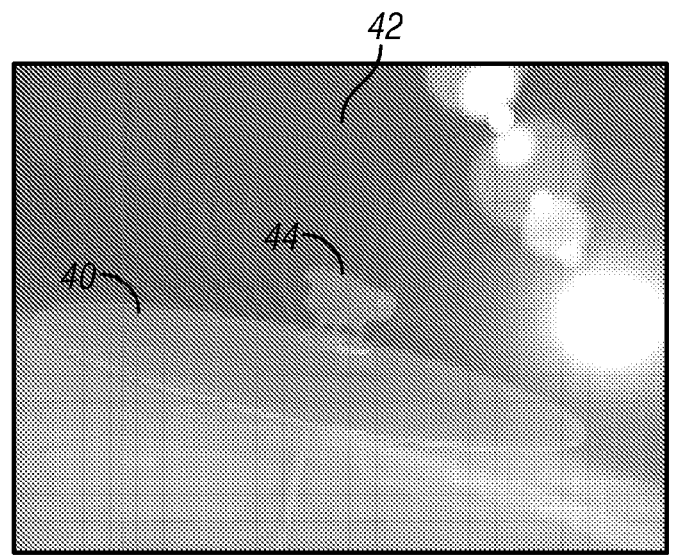
FIG. 8 is a perspective view of a HP centrally positioned at the base of a ULDB.

A hyperspectral polarimeter flight unit 44 could be mounted at the base 40 of a ULDB 42, as shown in FIG. 8, and rotate based on feedback from a solar tracking device. The images obtained can then be analyzed on-board to determine the strain in the balloon wall and the results can be sent back to the ground via a radio transmitter.

The operation of the Hyperspectral Polarimeter 44 is consistent with the description of FIGS. 1 and 8, where the scattered sunlight provides the initial polarization for analysis. As the scattered light passes through the balloon film 42 (See FIG. 8), birefringence resulting from strain in the film retards one optical axis with respect to the other. After crossing the balloon film, the light is collected by a lens assembly 46 attached to the inlet of the HP. By proper location of the detector, the lens 46 allows the HP to observe the entire interior of the balloon surface. The light then passes through a polarizer 48 that has its axis dynamically oriented relative to the polarization orientation of the incoming scattered light. This orientation is determined by noting the position of the sun, which is tracked as the brightest light source. On crossing this polarizer, the light spectrum is non-uniformly attenuated with respect to wavelength because of the optical retardation of one optical axis with respect to the other. If the balloon film is not strained, the incoming light would be unaltered and, hence, blocked by the polarizer. However, if the film is strained even a fraction of a percent, the light experiences a phase difference which varies depending on the light wavelength. As a result, an interference spectrum is produced which uniquely identifies the optical retardation of the light and, hence, the strain in the balloon film. By imaging the balloon with a hyperspectral analyzer, a full visual spectrum is recorded for each pixel of the compiled image. Each spectrum can then be fit with a function to determine the optical retardation produced by the balloon film and, thus, the strain in that film. By assigning a strain value to each pixel of the compiled image, a color-mapped image of the balloon can then be constructed to show the balloon film strain in real time. This data can then be sent to the ground control center via radio communication link either continuously or on command from ground control.

Figure 9:
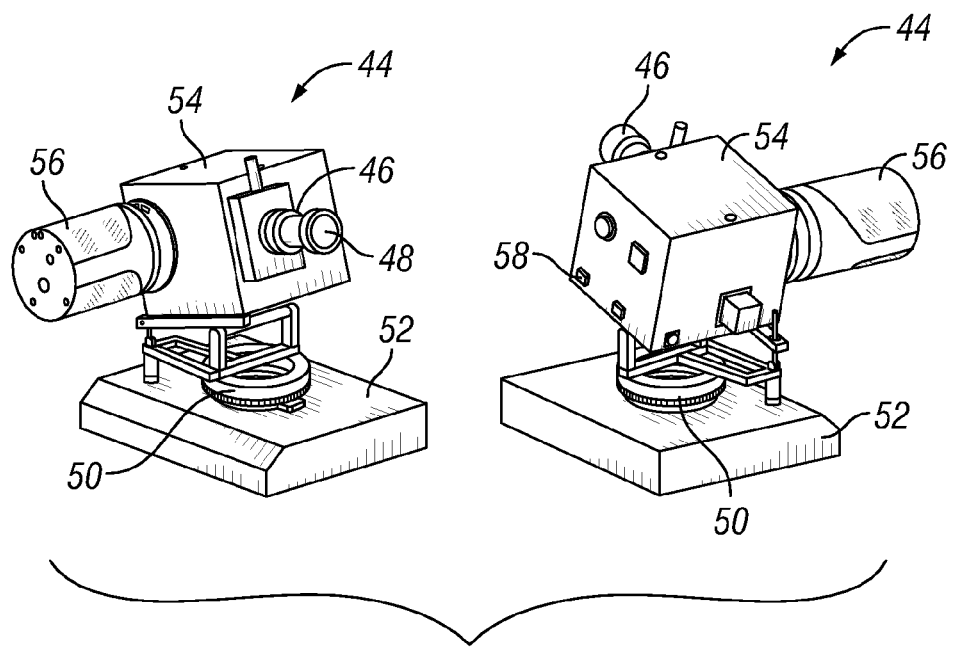
FIG. 9 provides front and back perspective views of a hyperspectral polarimeter arrangement suitable for use in a ULDB, in which the electronics will control the rotation of the base, the tilt of the spectrograph, and the rotation of the polarizer on the front of the unit through feedback loops created by optical encoders. Data is relayed from the spectrograph and CCD camera to the central computer in the base of the unit for computational analysis, balloon image reconstruction, and strain map generation.

A hyperspectral polarimeter 44 is shown in FIG. 9. Rotators 50 with optical-encoder feedback orient the unit in the direction of maximally polarized sunlight, perpendicular to the direction of the sun, and provide the tilt needed to scan the entire balloon surface, and rotate the polarizer 48 on the front of the unit to generate the measurements needed for strain analysis. The electronics to control this motion may be housed in the base 52 of the unit. The base may also house the central processor, which may be a laptop computer. The central computer will communicate with the spectrograph 54 and CCD camera 56, such as through a USB 2.0 interface 58, and will preferably analyze the hyperspectral data cubes collected to determine strain in the balloon film.

The measurements in the above Examples have demonstrated strain measurement in ULDB film with an accuracy of better than ±2% of the measured strain value and a full measurement range from 0% strain to well beyond the operating point of ULDBs. The HP can be installed on existing balloons without modification of balloon design except for a small mount near the base of the balloon. After a mission is complete, the HP can be recovered by parachute and reused for later missions.

The optical assembly is preferably capable of both a wide field of view of roughly 120°, to cover large swaths of balloon film for scanning operations, as well as a telephoto range of 10° for more detailed inspections of film areas. Although simple lens assemblies may be used, such as a Tessar, Double Gauss (Biotar), or Cooke (Taylor) triplet, a more advanced optical design might also be used.

Gratings can also be selected which are tailored for the wavelength range of interest, currently 500-650 nm, and which spread this range across the CCD imaging array. A 50 g/mm grating with a 600 nm blaze wavelength would be well suited to this task.

The CCD camera is the last stage of the light path and critical for accurate detection of the signal. The CCD should be fast, sensitive, and have the resolution required for imaging. In one embodiment, the camera may be oriented so that 1,340 pixels are used for spatial resolution (such as in the Y direction) and only 100 pixels are used for spectral resolution. Since the spectral profile is slowly varying, this resolution should be adequate for curve fits, whereas the spatial resolution will be more important for high-resolution film analysis.

The unit may then be actuated through mechanical rotators. Specifically, the HP is preferably capable of movement and orientation measurement through three degrees of rotational freedom to image all surfaces of a balloon. For example, the logic for the rotational control and position measurement system may utilize a spherical coordinate system. In practice, the HP is preferably located at the base of the balloon, but need not necessarily be positioned exactly in its center. Precise angular measurement and control are needed both to obtain adequate resolution as well as good registration accuracy when a strain map is reconstructed from individual images acquired as the balloon rotates. Additionally, the value of θ must be known precisely so that the images collected can be accurately matched to actual physical locations on the balloon. To achieve this requirement, a stepper motor and encoder may be used to rotate the base of the HP and measure its rotational position. A second degree of freedom corresponds to attitude measurement and control necessary to view various elevations or latitudes of the balloon. The HP may pivot forward and back on a horizontal axle, as driven by a linear actuator connecting the rear of the spectrograph mounting bracket to the base bracket. The linear actuator position may also be monitored by an embedded encoder to provide attitudinal feedback.

Lastly, the analyzing polarizer must be rotated about its axis in order to complete the actual measurement of balloon strain. The rotational accuracy requirement for this rotator is actually the least stringent of the three described here. A deviation from the intended rotation as large as 8° would affect the measured retardation value by less than 1%. However, as opposed to the other three, actuation is preferably rapid, because as many as three different orientations between 0° and 90° may be necessary.

The power supply for the HP in the ULDB may be a lithium ion battery pack. The power supply is used to power the spectrograph, the CCD Camera, the stepper motors, the encoders, and the computer processor. For example, a laptop computer may be used as the master system control.

The software is responsible for timing and synchronizing the motion of all actuators in the system, including the rotators, shutter, and grating turret, with the collection of raw data from the CCD array. Different operating modes may be accommodated depending on whether a zoomed-in image of a film section or a wide-ranging view of a major section of the balloon is being obtained. Coordination between the actuation elements and camera preferably has accurate registration between all the "slices" of the hyperspectral data cube.

All data signals for actuation can originate from the laptop software and be transmitted through digital TTL pulses to avoid timing delays. Mechanical actuation, both of rotators and the shutter, would be the most significant contributor to the time required for one image capture. Therefore, timing delays to allow mechanical elements to complete their motions must be integrated with the timing requirements for the camera, itself.

In one embodiment, each pixel is treated independently, including background determination, so that variations in background intensity can be directly accounted for on a pixel-by-pixel basis. Pixel analysis and polarization rotation positions are based on the generalized equation for optical retardation, $T=B[(1-P)+P\{Cos^2\phi - Sin[2(\tau-\phi)] \cdot Sin[2\tau] \cdot Sin^2[\pi \cdot \delta/\lambda]\}]$. Here, T is the transmitted light intensity, B is the background light intensity as would be seen through parallel polarizers and unstrained film, P is the polarization fraction, $\phi$ is the angle between the sun polarization and the analyzing polarizer privileged directions, $\tau$ is the angle between the sun polarization and the film strain privileged directions, $\lambda$ is the wavelength of light, and $\delta$ is the optical retardation. Again, $\delta$ is defined as $\tau \cdot \Delta n$, where $\tau$ is the effective film thickness and $\Delta n$ is the film birefringence, equal to the product of the strain-optic constant and the difference in principal film strains. By working directly from the generalized equation, the computer program will be capable of determining the strain value even in the complex lighting environment found during a stratospheric flight.

The present invention may be implemented in stratospheric balloons used to perform high-altitude experiments economically. NASA engineers could use the data collected to better understand the behavior of ULDBs in flight, to predict their performance on future missions or modify future designs of the ULDB shell. The device can continuously monitor all film strain in a balloon, in-flight and in real time, from a single point of observation.

In a further embodiment, the proposed Hyperspectral Polarimeter system could be implemented without use of a spectrograph. In this implementation, the system would be identical in all respects but, after crossing the polarizer, light would be directly imaged on a CCD array, instead of first passing through a spectrometer. Instead of taking a full spectrum of the incident light, the intensity would be recorded at the wavelengths corresponding to red, green, and blue light. Although this recording method would provide some information about the light spectrum, it would also be highly affected by signal noise. The precision and accuracy would be considerably reduced, compared to the capabilities of the hyperspectral polarimeter. Additionally, complex interference spectra could not be accurately reproduced, since only three points on the spectral curve would be represented.

Embodiments Utilizing Fiber Optics

In a further embodiment, the invention may utilize an array of fiber optic cables to transmit the light which has passed through the birefringent material into the spectrograph. At the entrance to the spectrograph, the fiber optic cables that made up the optical array, which collectively form a field of view that is square or other shape, are rearranged into a line to match with the entrance slit of the spectrograph. The light from each individual fiber is diffracted off a grating and images on a specific row of a CCD camera. This measurement configuration enables simultaneous acquisition of spectral data from each of the pixels that make up the instrument's field of view. Accordingly, there is no scanning or panning necessary which would blur rapid events. Once the spectra from each pixel in the fiber array have been read by the spectrograph, they can each be curve fit, based on the known transmission function for the material. In a reduced form, the transmitted light intensity is $T_\lambda = B \cdot Sin^2[\pi \cdot \delta/\lambda]$, where B is the background light intensity, $\lambda$ is the wavelength of light, and $\delta$ is the optical retardation of the light, equal to the birefringence of the material times its thickness, $\delta = \Delta n \cdot \tau$.

In a specific embodiment, the optical fiber array may form a square that is 32 pixels (fibers) wide and 32 pixels (fibers) long, so that 1,024 spectra will stream to on-board memory for later analysis. Using high speed electronics this amount of spectral data might be acquired every 0.5 milliseconds. The array could image a large area or the light from a smaller area can be focused into the array for higher resolution of the data.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "a solution comprising a hydrocarbon-containing compound" should be read to describe a solution having one or more hydrocarbon-containing compound. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. It is intended that this foregoing description is for purposes of illustration only and should not be construed in a limiting sense. Only the language of the following claims should limit the scope of this invention.

What is claimed is:

1. A method of identifying strain in a birefringent material, comprising:
    measuring light intensity (I) as a function of wavelength ($\lambda$) from a polarized light source through the surface area of the birefringent material and another polarizer;
    identifying the location of light intensity measurements that indicate the presence of optical retardation beyond a setpoint; and
    calculating a differential strain value representative of the extent of the optical retardation.

2. The method of claim 1, wherein the birefringent material is a film.

3. The method of claim 1, wherein the birefringent material is a fiber or collection of woven fibers.

4. The method of claim 1, wherein the birefringent material is a solid object.

5. The method of claim 1, wherein the birefringent material is low-density polyethylene (LDPE), high-density polyethylene (HDPE), polypropylene, polyethylene terephthalate (PET), polyvinyl chloride (PVC), polyvinylidene chloride, polyester, nylon, or cellophane film.

6. The method of claim 1, wherein the source of polarized light is scattered sunlight or other ambient light.

7. The method of claim 1, further comprising:
    correlating the differential strain with the optical retardation of the material.

8. The method of claim 1, further comprising:
    generating a real-time quantitative strain map.

9. The method of claim 1, further comprising:
    scanning over the surface of the birefringent material to collect a multispectral image.

10. The method of claim 9, wherein the multispectral image is a hyperspectral image.

11. The method of claim 1, further comprising:
    automatically initiating steps to adjust the differential strain in the material.

12. The method of claim 1, wherein the birefringent material is a balloon wall.

13. The method of claim 1, wherein the birefringent material is parachute fabric.

14. The method of claim 1, further comprising:
    storing the measured light intensity data in a computer readable medium; and
    repeating the step of measuring light intensity (I) as a function of wavelength ($\lambda$) over the same surface area of the birefringent material; and then
    identifying a location over the surface area where the measured light intensity data taken at the same location has changed more than a set amount over time.

15. The method of claim 14, wherein the birefringent material forms a balloon, the method further comprising:
    reducing pressure inside the balloon in response to identifying a location over the surface area where the measured light intensity data taken at the same location has changed more than a set amount over time.

16. The method of claim 1, wherein the step of measuring is performed in the absence of any differential strain nonuniformity so that the optical retardation is attributable to deviations in thickness, the method further comprising:
    automatically or manually adjusting equipment producing the birefringent material to control the thickness.

17. The method of claim 16, wherein the birefringent material is a polymer film.

18. The method of claim 1, wherein the light source is fractionally polarized.

19. The method of claim 18, wherein the fractionally polarized light is greater than 50 percent polarized.

20. The method of claim 1, further comprising:
transmitting the polarized light passing through the birefringent material to a spectrograph using an array of fiber optic cables; and
acquiring and analyzing spectral data from each of the fiber optic cables.

21. The method of claim 20, wherein the step of acquiring and analyzing the spectral data comprises diffracting the light from each fiber optic cable and imaging the diffracted light on a selected row of a CCD camera.

22. The method of claim 20, wherein the array of fiber optic cables is a square array having multiple rows and columns.

23. A method of identifying strain, comprising:
detecting light intensity (I) as a function of wavelength ($\lambda$) from polarized light transmitted through birefringent material and another polarizer for each of a plurality of regions over a surface of birefringent material under differential strain ($\Delta\sigma$)
calculating an optical retardation ($\delta$) value for each of the plurality of regions as the best fit of the light intensity (I) as a function of wavelength ($\lambda$) data for that region using the transmittance relation $T \propto Sin^2[\pi(\delta/\lambda)]$, wherein the transmittance (T) is a ratio of the light intensity detected under differential strain ($I_{strain}$) to light intensity through the birefringent material without strain ($I_{relaxed}$) or with unpolarized light or with linearly polarized light in which the polarization axis is aligned with the primary strain direction, as a function of wavelength ($\lambda$); and
calculating a differential strain ($\Delta\sigma$) value for each of the plurality of regions by applying a correlation between differential strain ($\Delta\sigma$) and optical retardation ($\delta$) calculated for that region.

24. The method of claim 23, further comprising:
identifying each of the plurality of regions by coordinates; and
producing a map of the differential strain values arranged by the coordinates of the plurality of regions.

25. The method of claim 23, wherein differential strain for each region of birefringent material is a percentage of elongation in a first direction in excess of a percentage of elongation in an orthogonal direction.

26. The method of claim 23, wherein the step of detecting light intensity (I) as a function of wavelength ($\lambda$) for each of a plurality of regions includes the steps of:
(a) detecting light intensity (I) as a function of wavelength ($\lambda$) for each of a plurality of regions positioned along a first coordinate axis, and then
(b) repeating step (a) for each of plurality of positions along a second coordinate axis.

27. The method of claim 23, further comprising:
determining the polarization fraction of incoming light.

28. The method of claim 27, further comprising:
using the polarization fraction to distinguish intensity variations resulting from changes in polarization fraction from intensity variations resulting from film strain.

29. The method of claim 28, further comprising:
factoring out intensity variations resulting from changes in polarization fraction.

30. The method of claim 23, further comprising:
using a lens to control the size of each of the regions.

31. A computer program product comprising a computer useable medium including a computer readable program, wherein the computer readable program when executed on a computer causes the computer to:
record light intensity (I) as a function of wavelength ($\lambda$) of polarized light transmitted through birefringent film and a second polarizer for each of a plurality of regions over a surface of birefringent material under differential strain ($\Delta\sigma$);
calculate an optical retardation ($\delta$) value for each of the plurality of regions as the best fit of the light intensity (I) as a function of wavelength ($\lambda$) data for that region using the relation transmittance $T \propto Sin^2[\pi(\delta/\lambda)]$, wherein the transmittance (T) is a ratio of the light intensity detected under differential strain ($I_{strain}$) to light intensity through the birefringent material without strain ($I_{relaxed}$) as a function of wavelength ($\lambda$); and
calculate a differential strain ($\Delta\sigma$) value for each of the plurality of regions by applying a correlation between optical retardation ($\delta$) and differential strain ($\Delta\sigma$) to the optical retardation ($\delta$) value calculated for that region.

32. The computer program product of claim 31, wherein the computer readable program when executed on a computer further causes the computer to:
identify each of the plurality of regions by coordinates; and
produce a map of the differential strain values arranged by the coordinates of the plurality of regions.

33. The computer program product of claim 31, wherein differential strain for each region of birefringent material is a percentage of elongation in a first direction in excess of a percentage of elongation in a second direction.

34. The computer program product of claim 31, wherein the computer readable program when executed on a computer further causes the computer to:
(a) detect light intensity (I) as a function of wavelength ($\lambda$) for each of a plurality of regions positioned along a first coordinate axis, and then
(b) repeat step (a) for each of plurality of positions along a second coordinate axis.

35. A system for identifying strain in a birefringent material using a light source having an unknown polarization fraction, a variable polarization fraction or non-uniform distribution of polarization fraction, comprising:
a hyperspectral polarimeter including a CCD camera, spectrograph, lens, and rotating polarizer for measuring light intensity as a function of wavelength, wherein the lens is disposed to focus light into the spectrograph, and wherein the rotatable polarizer is disposed in front of the lens or between the lens and the hyperspectral polarimeter;
a computer processor in communication with the CCD camera for receiving the light intensity measurements; and
a computer readable medium in communication with the processor and containing instructions, which when executed by the processor, cause the processor to determine an optical retardation value from the recorded intensity measurements, map this to a differential strain value, and create a map of strain in the birefringent material under analysis.

36. The system of claim 35, further comprising:
a solar tracking device; and
a rotatable base for controllably rotating the hyperspectral polarimeter at approximately right angles to the sun.

* * * * *